(12) United States Patent
Liao et al.

(10) Patent No.: US 12,725,940 B2
(45) Date of Patent: Sep. 1, 2026

(54) WI-FI DBDC RF FRONT-END CIRCUIT DESIGNS

(71) Applicant: MediaTek Inc., Hsinchu City (TW)

(72) Inventors: Tzu-Hao Liao, Hsinchu City (TW); Shen-Yi Liao, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/096,483

(22) Filed: Jan. 12, 2023

(65) Prior Publication Data

US 2023/0238716 A1 Jul. 27, 2023

Related U.S. Application Data

(60) Provisional application No. 63/303,123, filed on Jan. 26, 2022, provisional application No. 63/321,794, filed on Mar. 21, 2022.

(51) Int. Cl.

| | |
|---|---|
| ***H01Q 21/28*** | (2006.01) |
| ***H04B 1/04*** | (2006.01) |
| ***H04B 7/0413*** | (2017.01) |

(52) U.S. Cl.

CPC .......... *H01Q 21/28* (2013.01); *H04B 1/0483* (2013.01); *H04B 7/0413* (2013.01)

(58) Field of Classification Search

CPC .... H01Q 21/28; H04B 1/0483; H04B 7/0413; H04B 1/0064

USPC .......................................... 455/101, 103, 91

See application file for complete search history.

(56) References Cited

U.S. PATENT DOCUMENTS

| | | | | |
|---|---|---|---|---|
| 9,331,835 | B1 | 5/2016 | Lee et al. | |
| 10,615,839 | B2 * | 4/2020 | Sato | H04B 1/0067 |
| 2009/0233642 | A1 | 9/2009 | Zhitnitsky | |
| 2011/0156815 | A1 | 6/2011 | Kim et al. | |
| 2011/0228713 | A1 * | 9/2011 | Alexopoulos | H04B 1/405 370/297 |
| 2017/0302429 | A1 | 10/2017 | Brighenti et al. | |
| 2018/0309528 | A1 * | 10/2018 | King | H04J 1/045 |
| 2019/0007072 | A1 | 1/2019 | Yuan et al. | |
| 2019/0027432 | A1 * | 1/2019 | Dalmia | H01L 24/13 |

(Continued)

OTHER PUBLICATIONS

European Patent Office, Extended European Search Report in European Patent Application No. 23152875.3, Jun. 26, 2023.

*Primary Examiner* — Juan A Torres

(74) *Attorney, Agent, or Firm* — Andy M. Han; Han IP PLLC

(57) ABSTRACT

Various pertaining to a Wi-Fi dual-band dual-concurrent (DBDC) radio frequency (RF) front-end circuit are described. A device, which is configured to facilitate wireless communications in a DBDC application and a multiple-input-multiple-output (MIMO) application, includes a front-end circuit configured to support transmission at a first frequency band and at a second frequency band. The front-end circuit includes at least two antennas, at least two diplexers, a first circuit path and a second circuit path. The first circuit path is coupled to one of the at least two antennas and is configured to transmit and receive at the first frequency band. The second circuit path is coupled to the other one of the at least two antennas and is configured to transmit and receive at the second frequency band. The first frequency band and the second frequency band are split from a Wi-Fi 5 GHz~6 GHz band.

19 Claims, 17 Drawing Sheets

(56) References Cited

U.S. PATENT DOCUMENTS

| | | | |
|---|---|---|---|
| 2020/0044345 | A1 | 2/2020 | Zimmerman |
| 2021/0058124 | A1 | 2/2021 | Pehlke |
| 2021/0099205 | A1 | 4/2021 | Seyed |
| 2021/0337054 | A1 | 10/2021 | Choi et al. |
| 2021/0351903 | A1 | 11/2021 | Mori |

* cited by examiner

| | WF1_G | WF2_G |
|---|---|---|
| 2G MIMO | ANT1 | ANT2 |

| | WF1_A | WF2_A |
|---|---|---|
| 6G MIMO | ANT3 | ANT2 |
| 5G MIMO | ANT1 | ANT2 |
| 5G + 6G DBDC | ANT1 | ANT2 |
| 6G + 5G DBDC | ANT3 | ANT2 |

| | WF1_G | WF2_G |
|---|---|---|
| 2G MIMO | ANT1 | ANT2 |

| | WF1_A | WF2_A |
|---|---|---|
| 6G MIMO | ANT3 | ANT2 |
| 5G MIMO | ANT1 | ANT2 |
| 6G + 5G DBDC | ANT3 | ANT1 |

| | WF1_G | WF2_G |
|---|---|---|
| 2G MIMO | Ant1 | Ant2 |

| | WF1_A | WF2_A |
|---|---|---|
| 6G MIMO | Ant1 | Ant2 |
| 5G MIMO | Ant1 | Ant2 |
| 5G + 6G DBDC | Ant1 | Ant2 |

WI-FI DBDC RF FRONT-END CIRCUIT DESIGNS

CROSS REFERENCE TO RELATED PATENT APPLICATIONS

The present disclosure is part of a non-provisional patent application claiming the priority benefit of U.S. Provisional Patent Application Nos. 63/303,123 and 63/321,794, filed 26 Jan. 2022 and 21 Mar. 2022, respectively, the contents of which herein being incorporated by reference in their entirety.

TECHNICAL FIELD

The present disclosure is generally related to radio frequency (RF) front-end design and, more particularly, to Wi-Fi dual-band dual-concurrent (DBDC) RF front-end circuit designs.

BACKGROUND

Unless otherwise indicated herein, approaches described in this section are not prior art to the claims listed below and are not admitted as prior art by inclusion in this section.

With the prevalence of wireless applications, more and more mobile (or portable) devices are capable of wireless communications via different wireless technologies such as, for example, Wi-Fi (or WiFi) and Bluetooth in dual RF bands. Such devices are generally equipped with a Wi-Fi and Bluetooth combo chip for 1×1 DBDC and 2×2 multiple-input-multiple-output (MIMO) applications. Existing 1×1 DBDC and 2×2 MIMO applications typically require the use of two filters, four single-pole-double-throw (SPDT) switches and two diplexers, for a total of eight key components to achieve a 45 dB isolation between the two frequency bands. The two frequency bands (or dual bands) comprise a low-frequency band (5180~5905 MHz) and a high-frequency band (5955~7115 MHz). In the continuing pursuit of reduction in manufacturing cost and reduction in overall weight, one challenge pertains to the reduction in the number of key components required in a mobile or portable device while maintaining or enhancing system performance. Therefore, there is a need for a solution of Wi-Fi DBDC RF front-end circuit designs to achieve reduction in the number of key components.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to Wi-Fi DBDC RF front-end circuit designs. Under various proposed schemes in accordance with the present disclosure, a frequency band may be divided into two parts, namely a low-frequency band and a high-frequency band, and at least two antennas and two diplexers may be utilized to provide sufficient isolation between the two frequency bands with at least four RF ports. It is believed that various schemes proposed herein may address or otherwise alleviate aforementioned issue(s) to achieve reduction in the number of key components in the RF front-end of a mobile device (e.g., from eight key components to four key components) while maintaining or enhancing system performance.

In one aspect, a device, which is configured to facilitate wireless communications in a DBDC application and a MIMO application, may include a front-end circuit configured to support transmission at a first frequency band and at a second frequency band. The front-end circuit may include at least two antennas, at least two diplexers, a first circuit path and a second circuit path. The first circuit path may be coupled to one of the at least two antennas and may be configured to transmit and receive at the first frequency band. The second circuit path may be coupled to the other one of the at least two antennas and may be configured to transmit and receive at the second frequency band. The first frequency band and the second frequency band may be split from a Wi-Fi 5 GHz~6 GHz band.

It is noteworthy that, although description provided herein may be in the context of certain radio access technologies, networks and network topologies such as, Wi-Fi and Bluetooth, the proposed concepts, schemes and any variation(s)/derivative(s) thereof may be implemented in, for and by other types of radio access technologies, networks and network topologies such as, for example and without limitation, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 1A, FIG. 1B, FIG. 10 and FIG. 1D each is a diagram of an example design under a proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to Wi-Fi DBDC RF front-end circuit designs. According to the present disclosure, a number of possible solutions may be implemented separately or jointly. That is, although these possible solutions may be described below separately, two or more of these possible solutions may be implemented in one combination or another.

Under various proposed schemes in accordance with the present disclosure, different new designs of a front-end circuit may be divided into a two parts: one for a low-frequency band and the other for a high-frequency band. Moreover, in each of the different new designs, at least two antennas and two diplexers may be utilized in order to provide sufficient isolation between the two bands. Furthermore, there may be at least four RF ports in each of the different new designs. It is noteworthy that, under various proposed schemes described herein, a diplexer may be configured to divide a larger frequency band into two or three smaller frequency bands, even though examples provided herein may show a larger frequency band being divided into two smaller frequency bands.

Figure 1A:
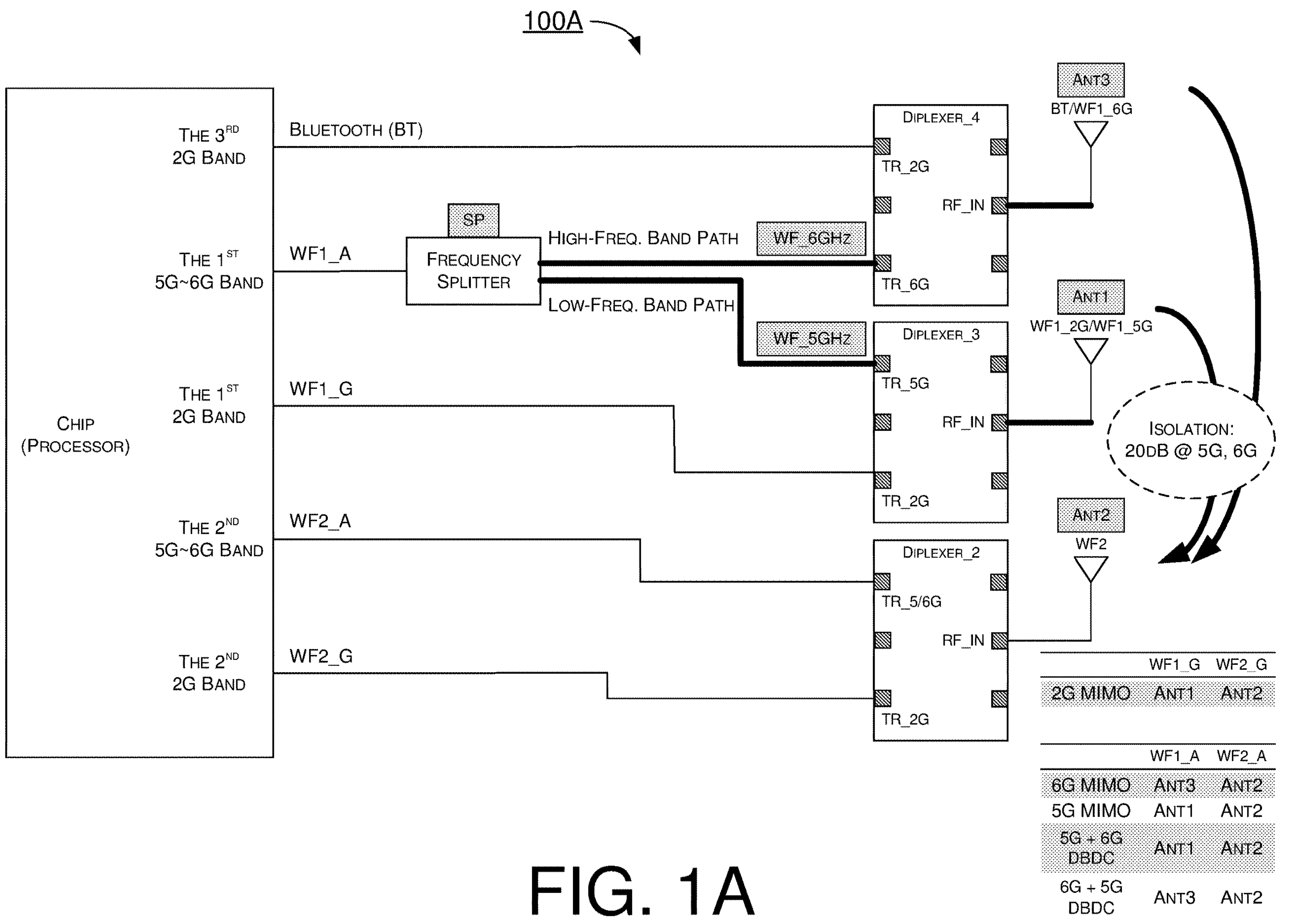
Figure 1B:
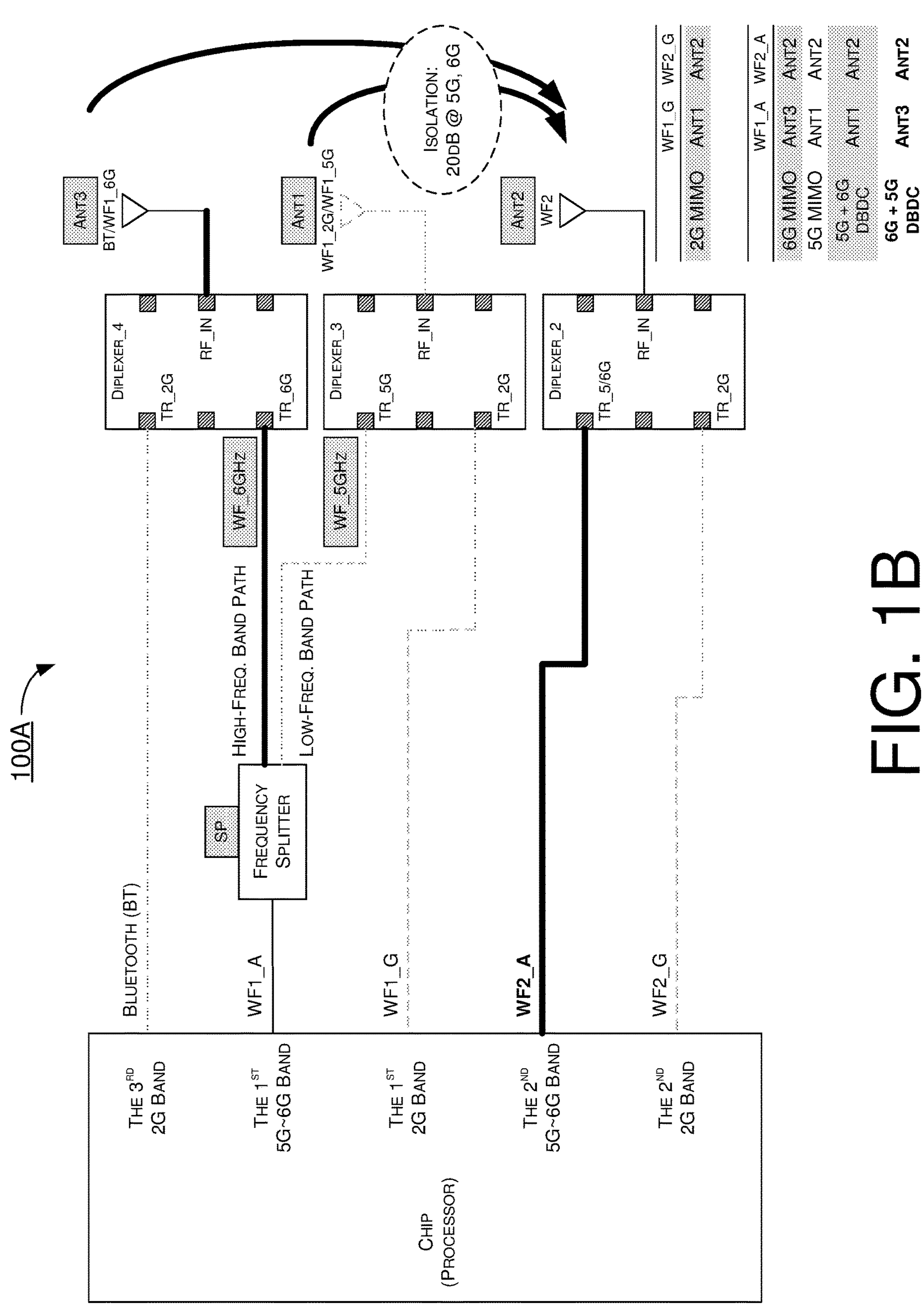
Figure 1C:
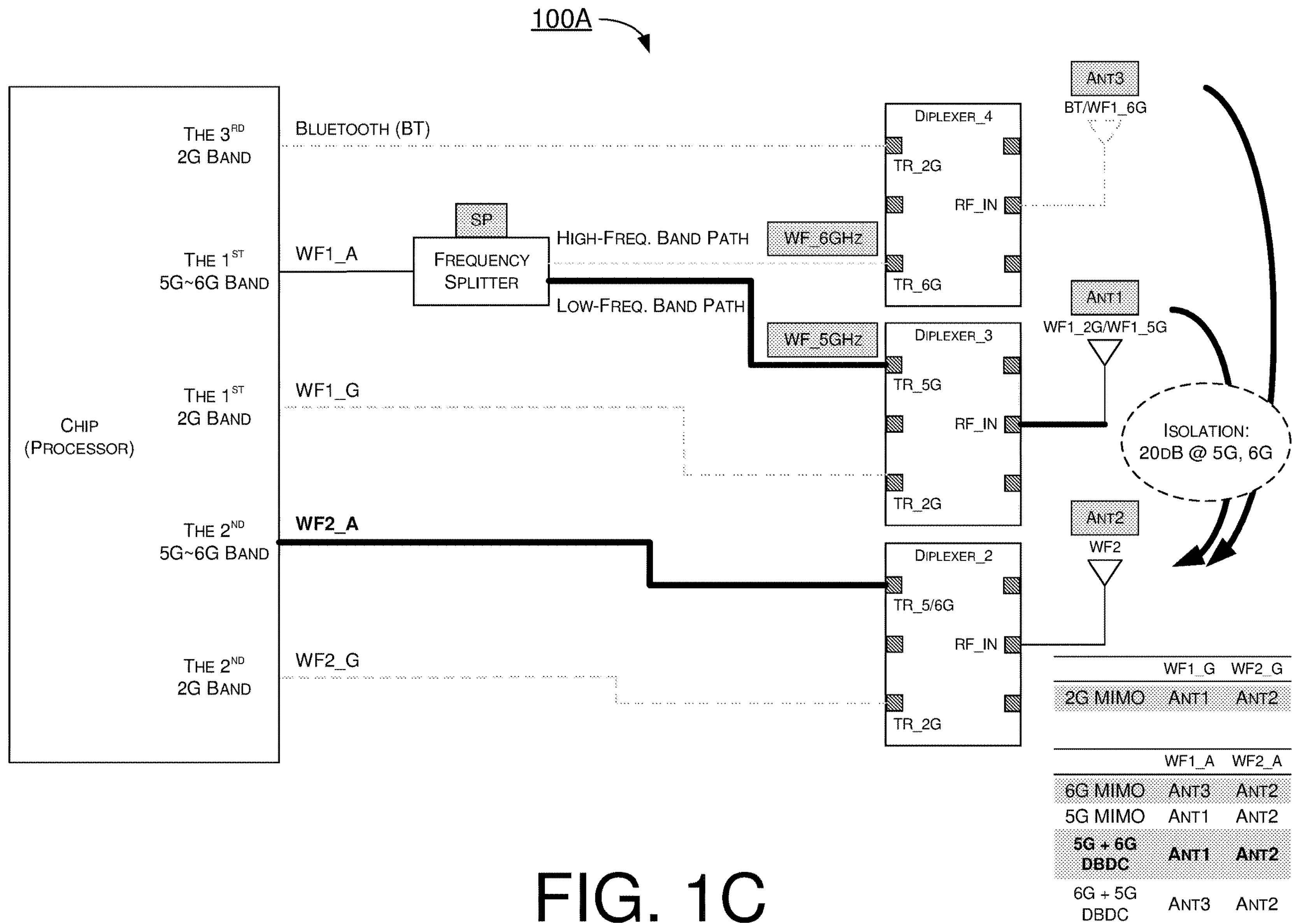

FIG. 1A, FIG. 1B and FIG. 10 each illustrates a respective aspect of an example design 100A of a front-end circuit under a first proposed scheme in accordance with the present disclosure. Referring to FIG. 1A, in design 100A, a first 5 GHz~6 GHz band (WF1_A, 5180~7115 MHz) port may be divided by a frequency splitter (SP) into two parts: a low-frequency band (5180~5905 MHz) and a high-frequency band (5955~7115 MHz). The frequency splitter (SP) may be implemented with a diplexer, switch or other component(s) as long as the first 5 GHz~6 GHz band port is divided into the low-frequency band and the high-frequency band. When used in DBDC applications, design 100A may utilize a first antenna (Ant1) for the low-frequency band (e.g., denoted as WF_5G in the figures) and a second antenna (Ant2) for the high-frequency band (e.g., denoted as WF_6G in the figures), and the other DBDC scenario is that a second antenna (Ant2) for the low-frequency band and a third antenna (Ant3) for the high-frequency band. The same applies to other figures of the present disclosure, such as FIG. 1D~FIG. 6B. When used in MIMO applications, design 100A may utilize Ant1 and a second antenna (Ant2) for Wi-Fi 2.4 GHz MIMO, use Ant2 and Ant3 for MIMO in the high-frequency band (5955~7115 MHz), and use Ant1 and Ant2 for MIMO in the low-frequency band (5180~5905 MHz). An isolation of 20 dB may be achieved at 5 GHz and 6 GHz. Comparing the new design 100A and the existing design 700A in FIG. 7A and existing design 700B FIG. 7B, it may be seen that the front-end circuit under new design 100A only utilizes four components while the front-end circuit under existing design 700 A in FIG. 7A and existing design 700B FIG. 7B utilizes eight components. FIG. 1B illustrates one DBDC scenario of example design 100A with a second antenna (Ant2) for the low-frequency band and a third antenna (Ant3) for the high-frequency band. FIG. 10 illustrates another DBDC scenario of example design 100A with a first antenna (Ant1) for the low-frequency WG_5G band and a second antenna (Ant2) for the high-frequency WF_6G band. It is noteworthy that, although an isolation of 20 dB is given as an example in the description and illustration of various examples, a different amount of isolation (e.g., 10 dB, 45 dB or else) may also be achieved under various proposed schemes in accordance with the present disclosure.

Figure 1D:
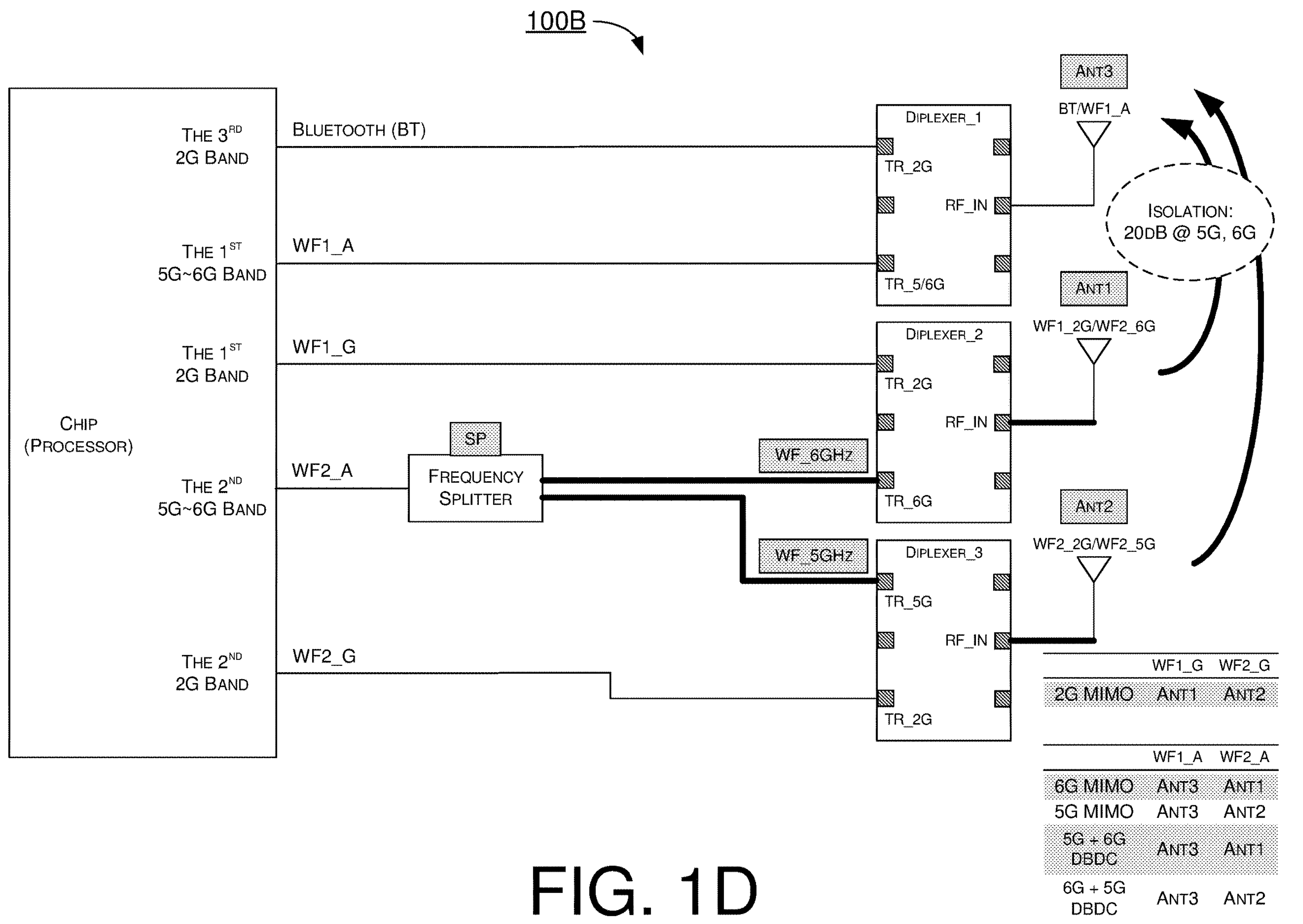

FIG. 1D illustrates an example design 100B of a front-end circuit under the first proposed scheme in accordance with the present disclosure. Referring to FIG. 1D, design 100B may include three antennas, five RF ports including one Bluetooth RF port, two Wi-Fi G-band (WF1_G and WF2_G, 2412~2484 MHz) RF ports, and two Wi-Fi 5 GHz~6 GHz band (WF1_A and WF2_A, 5180~7115 MHz) RF ports. Moreover, three diplexers and one frequency splitter may be utilized in design 100B. The location of WF_5 GHz (5180~5905 MHz) and WF_6 GHz (5955~7115 MHz) may be exchanged or otherwise swapped. The order of RF ports may be, from top to bottom as shown in FIG. 1D, a Bluetooth port (or, alternatively, a Wi-Fi G-band port), a Wi-Fi 5 GHz~6 GHz-band port, a Wi-Fi G-band port (or, alternatively, a Bluetooth port), a Wi-Fi 5 GHz~6 GHz-band port, and a Wi-Fi G-band port (or, alternatively, a Bluetooth port). The locations and order of the diplexers and antennas in design 100B may be exchanged. An isolation of 20 dB may be achieved between Ant1 and Ant2 or Ant3 and Ant2 at 5 GHz and 6 GHz when used as DBDC. It is noteworthy that, in the figures, an isolation between a given pair of two antennas (e.g., 20 dB) is shown in the context of a respective DBDC application. In the example shown in FIG. 1D, as there are two DBDC applications, two isolations between two pairs of antennas are shown. The same applies to other figures of the present application.

Figure 2A:
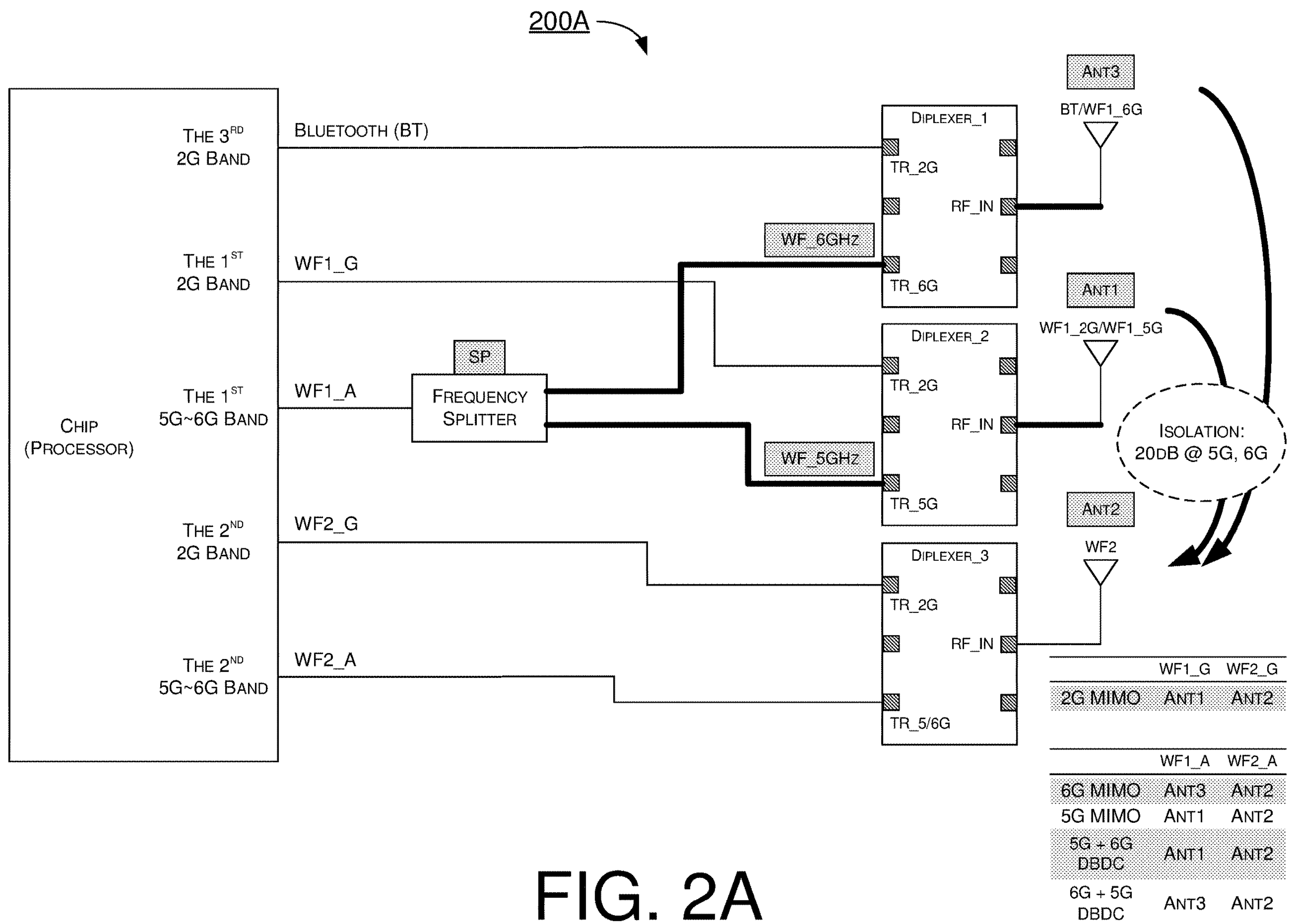
FIG. 2A and FIG. 2B each is a diagram of an example design under a proposed scheme in accordance with the present disclosure.
Figure 2B:
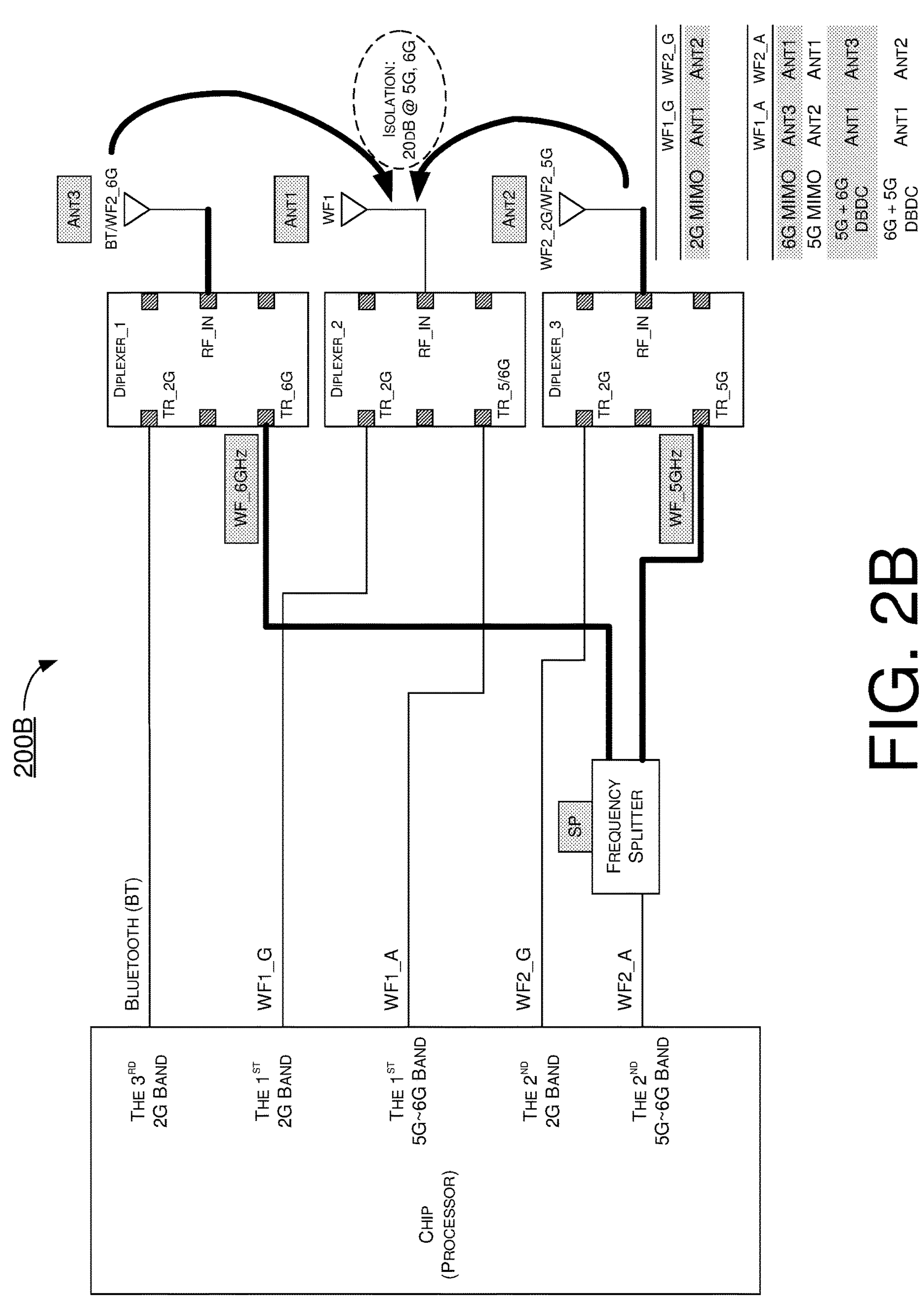

FIG. 2A and FIG. 2B each illustrates a respective aspect of an example design 200A or 200B of a front-end circuit under a second proposed scheme in accordance with the present disclosure. Referring to FIG. 2A and FIG. 2B, each of designs 200A and 200B may include three antennas, five RF ports including one Bluetooth RF port, two Wi-Fi G-band (WF1_G, 2412~2484 MHz) RF ports, and two Wi-Fi 5 GHz~6 GHz band (WF1_A, 5180~7115 MHz) RF ports. Moreover, three diplexers and one frequency splitter may be utilized in each of designs 200A and 200B. The location of WF_5 GHz (5180~5905 MHz) and WF_6 GHz (5955~7115 MHz) may be exchanged or otherwise swapped. The order of RF ports may be, from top to bottom as shown in each of FIG. 2A and FIG. 2B, a Bluetooth port (or, alternatively, a Wi-Fi G-band port), a Wi-Fi G-band port (or, alternatively, a Bluetooth port), a Wi-Fi 5 GHz~6 GHz-band port, a Wi-Fi G-band port (or, alternatively, a Bluetooth port), and a Wi-Fi 5 GHz~6 GHz-band port. The locations and order of the diplexers and antennas in each of designs 200A and 200B may be exchanged. An isolation of 20 dB may be achieved at 5 GHz and 6 GHz.

Figure 3A:
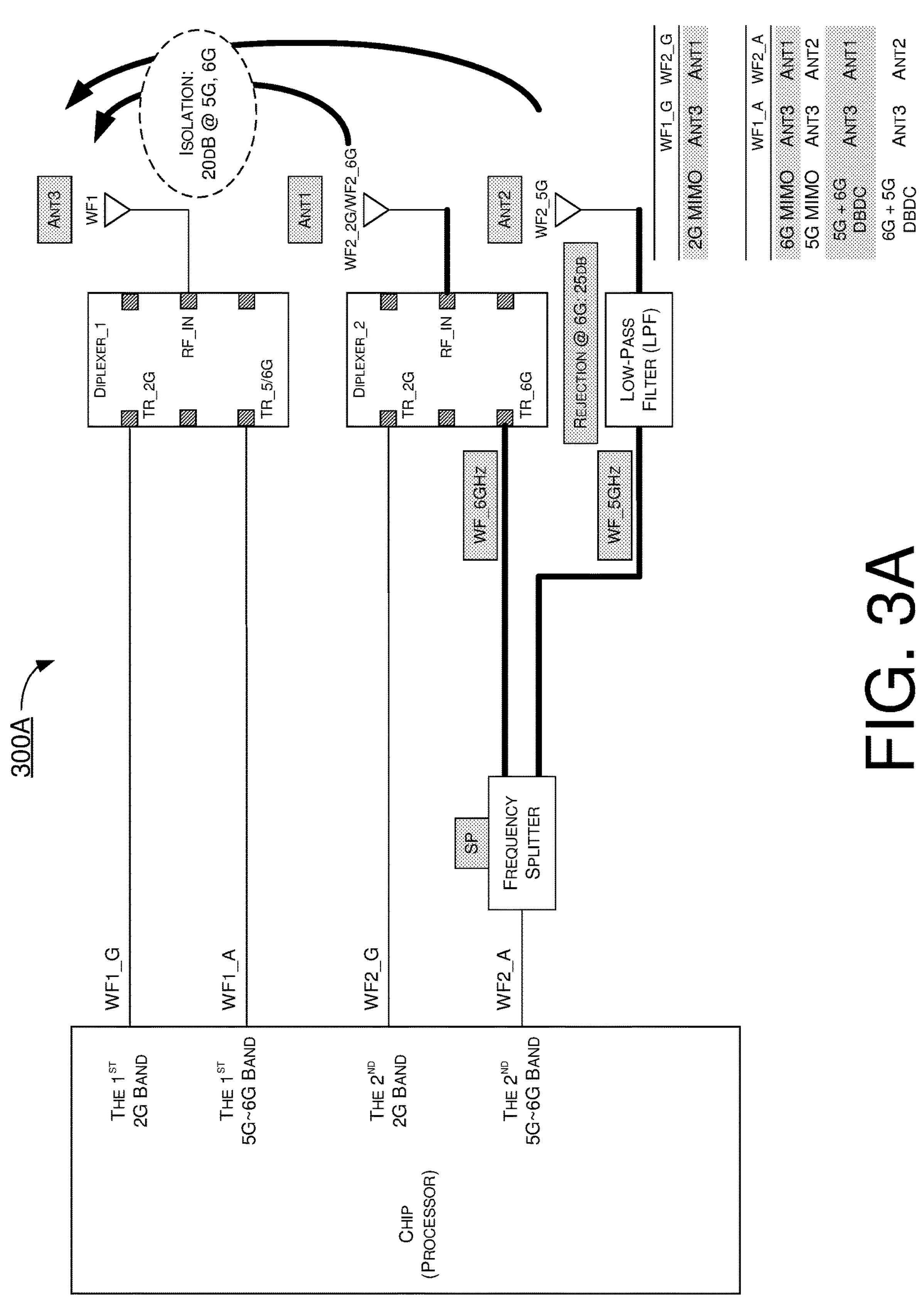
FIG. 3A and FIG. 3B each is a diagram of an example design under a proposed scheme in accordance with the present disclosure.
Figure 3B:
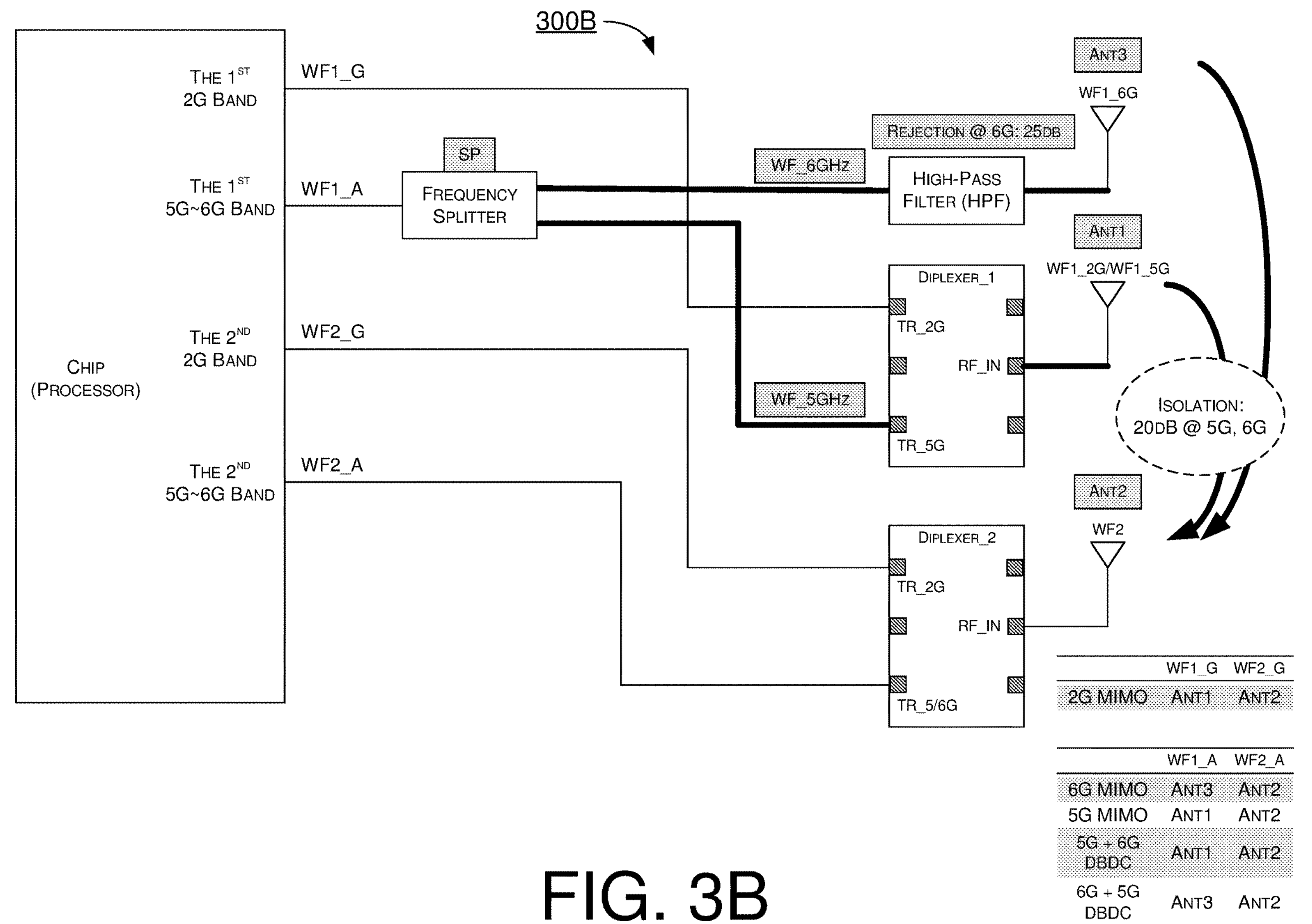

FIG. 3A and FIG. 3B each illustrates a respective aspect of an example design 300A or 300B of a front-end circuit under a third proposed scheme in accordance with the present disclosure. Referring to FIG. 3A and FIG. 3B, each of designs 300A and 300B may include three antennas, five RF ports including one Bluetooth RF port, two Wi-Fi G-band (WF1_G, 2412~2484 MHz) RF ports, and two Wi-Fi 5 GHz~6 GHz band (WF1_A, 5180~7115 MHz) RF ports. Moreover, three diplexers and one frequency splitter may be utilized in each of designs 300A and 300B. The location of WF_5 GHz (5180~5905 MHz) and WF_6 GHz (5955~7115 MHz) may be exchanged or otherwise swapped. The order of RF ports may be, from top to bottom as shown in each of FIG. 3A and FIG. 3B, a Wi-Fi G-band port, a Wi-Fi 5 GHz~6 GHz-band port, a Wi-Fi G-band port, and a Wi-Fi 5 GHz~6 GHz-band port. Alternatively, the order may be as follows, from top to bottom, a Wi-Fi 5 GHz~6 GHz-band port, a Wi-Fi G-band port, a Wi-Fi 5 GHz~6 GHz-band port, and a Wi-Fi G-band port. In design 300, a low-pass filter (LPF) may be utilized in one of the paths without a diplexer. The locations and order of the diplexers and antennas in each of designs 300A and 300B may be exchanged. An isolation of 20 dB may be achieved at 5 GHz and 6 GHz.

Figure 4A:
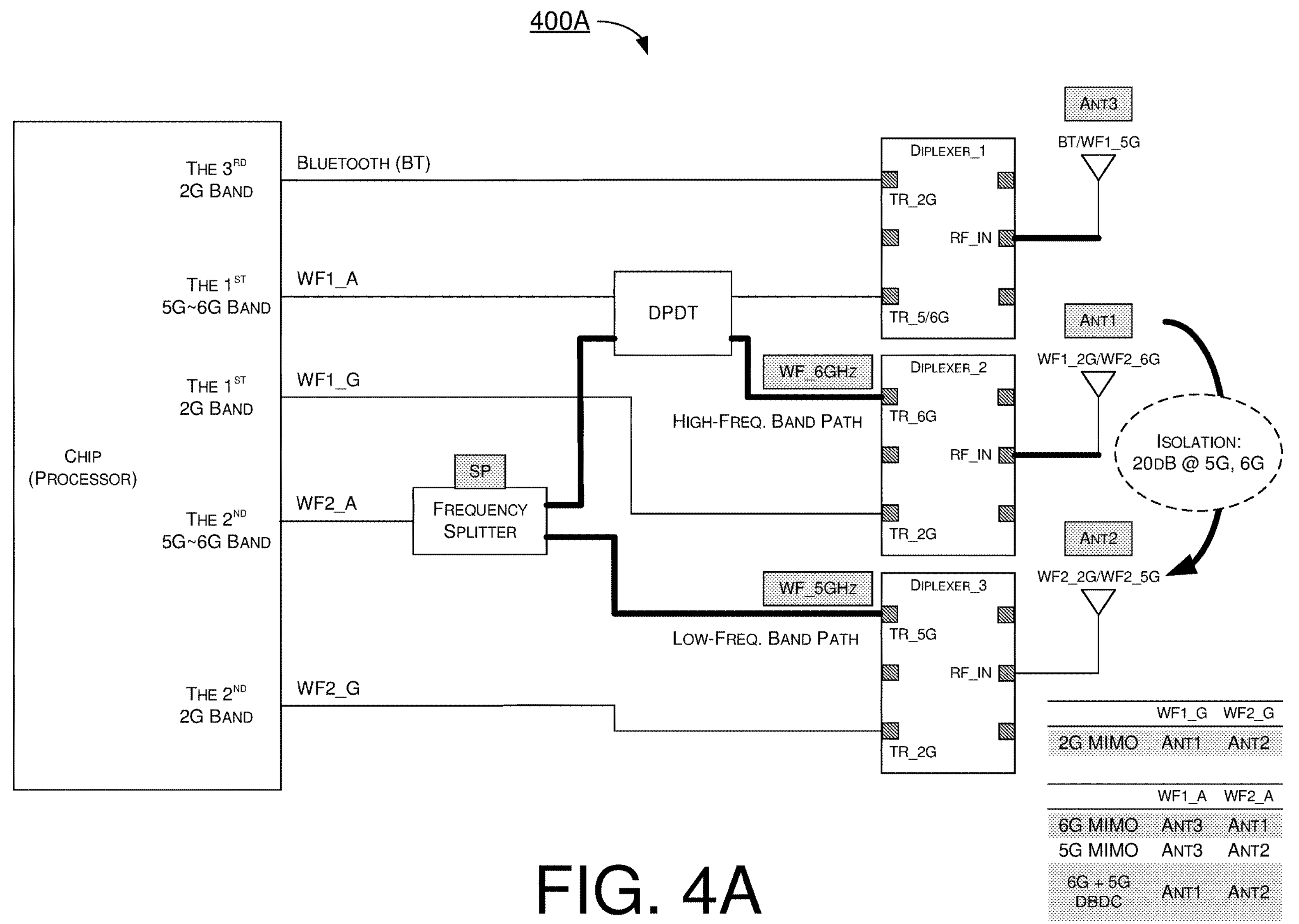
FIG. 4A and FIG. 4B each is a diagram of an example design under a proposed scheme in accordance with the present disclosure.
Figure 4B:
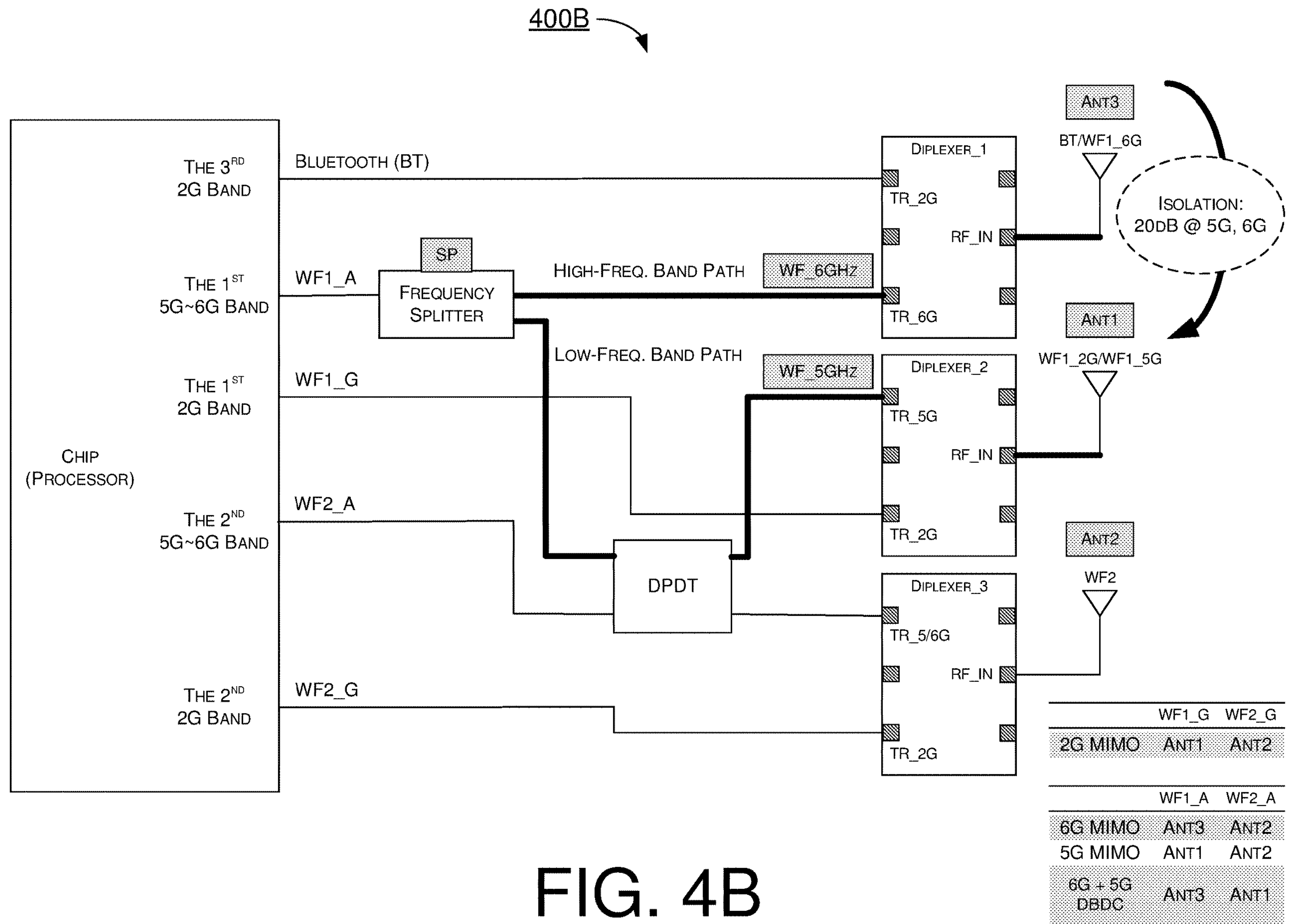

FIG. 4A and FIG. 4B each illustrates a respective aspect of an example design 400A or 400B of a front-end circuit under a fourth proposed scheme in accordance with the present disclosure. Referring to FIG. 4A and FIG. 4B, each of designs 400A and 400B may include three antennas, five RF ports including one Bluetooth RF port, two Wi-Fi G-band (WF1_G, 2412~2484 MHz) RF ports, and two Wi-Fi 5 GHz~6 GHz band (WF1_A, 5180~7115 MHz) RF ports. Moreover, three diplexers, one double-port-double-throw (DPDT) switch, and one frequency splitter may be utilized in each of designs 400A and 400B. The location of WF_5 GHz (5180~5905 MHz) and WF_6 GHz (5955~7115 MHz) may be exchanged or otherwise swapped. The order of RF ports may be, from top to bottom as shown in each of FIG. 4A and FIG. 4B, a Bluetooth port (or, alternatively, a Wi-Fi G-band port), a Wi-Fi 5 GHz~6 GHz-band port, a Wi-Fi G-band port (or, alternatively, a Bluetooth port), a Wi-Fi 5 GHz~6 GHz-band port, and a Wi-Fi G-band port (or, alternatively, a Bluetooth port). The locations and order of the diplexers and antennas in each of designs 400A and 400B may be exchanged. An isolation of 20 dB may be achieved at 5 GHz and 6 GHz between Ant1 and Ant2.

Figure 5A:
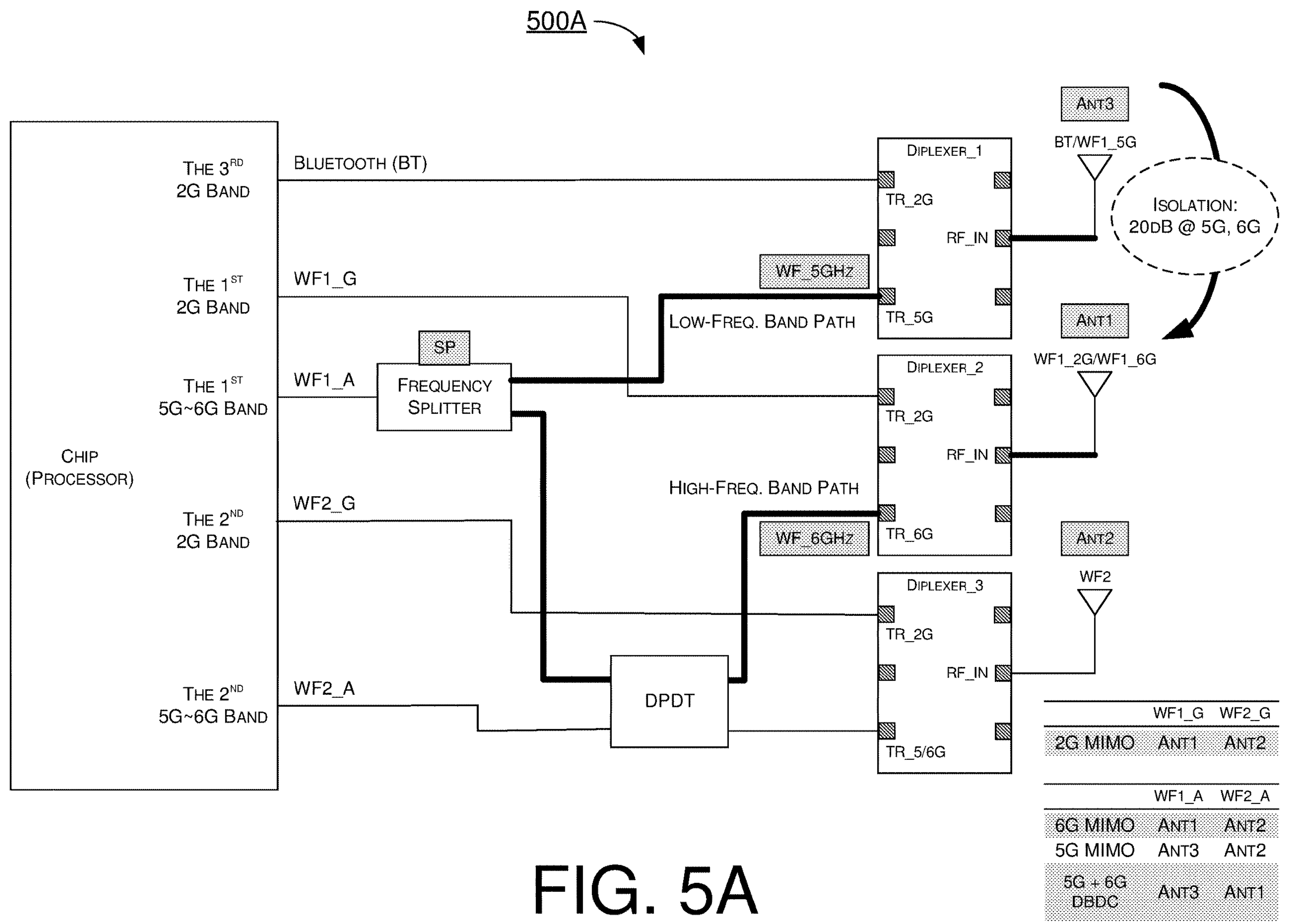
FIG. 5A and FIG. 5B each is a diagram of an example design under a proposed scheme in accordance with the present disclosure.
Figure 5B:
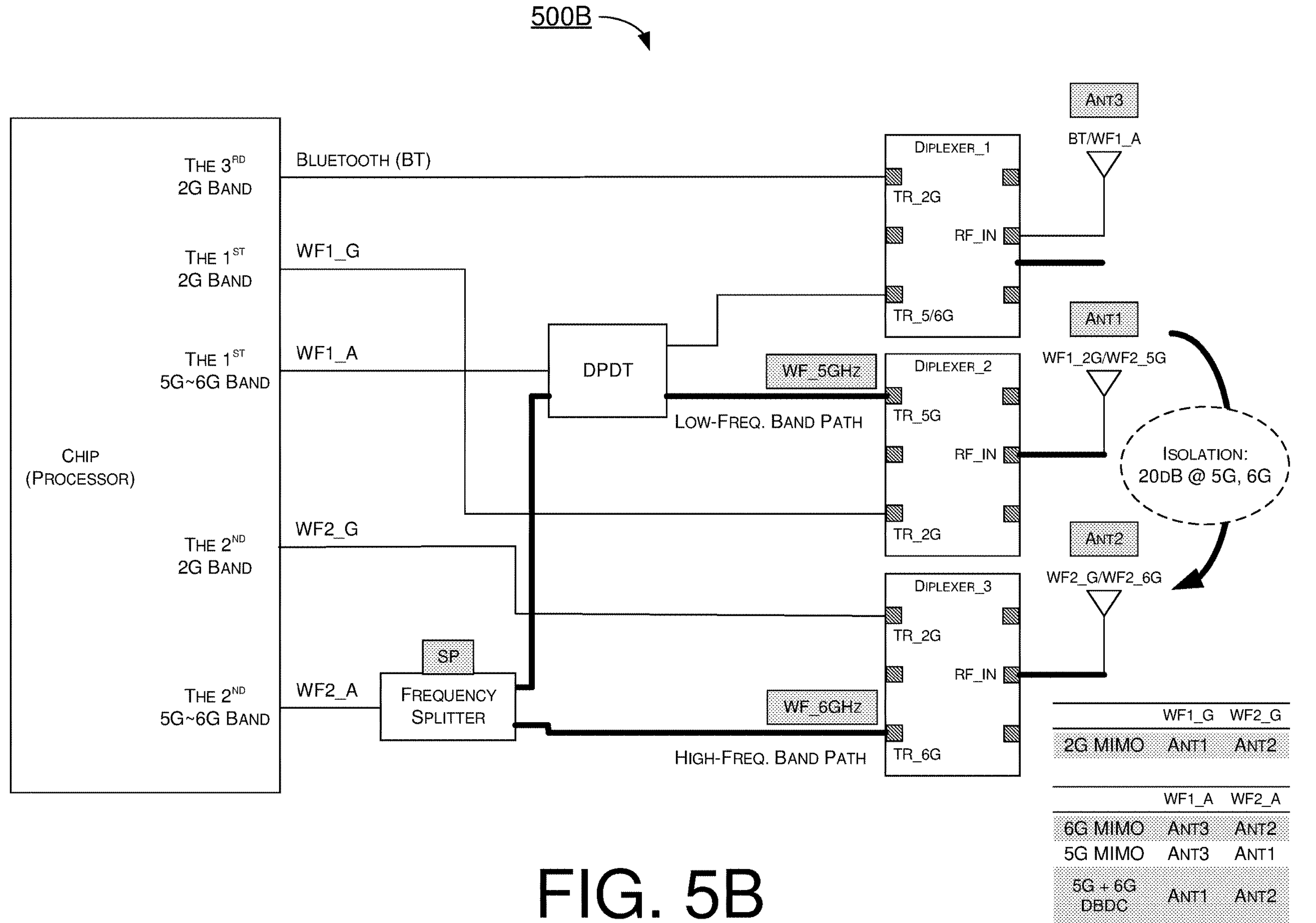

FIG. 5A and FIG. 5B each illustrates a respective aspect of an example design 500A or 500B of a front-end circuit under a fifth proposed scheme in accordance with the present disclosure. Referring to FIG. 5A and FIG. 5B, each of designs 500A and 500B may include three antennas, five RF ports including one Bluetooth RF port, two Wi-Fi G-band (WF1_G, 2412~2484 MHz) RF ports, and two Wi-Fi 5 GHz~6 GHz band (WF1_A, 5180~7115 MHz) RF ports. Moreover, three diplexers, one DPDT switch, and one frequency splitter may be utilized in each of designs 500A and 500B. The location of WF_5 GHz (5180~5905 MHz) and WF_6 GHz (5955~7115 MHz) may be exchanged or otherwise swapped. The order of RF ports may be, from top to bottom as shown in each of FIG. 5A and FIG. 5B, a Bluetooth port (or, alternatively, a Wi-Fi G-band port), a Wi-Fi G-band port (or, alternatively, a Bluetooth port), a Wi-Fi 5 GHz~6 GHz-band port, a Wi-Fi G-band port (or, alternatively, a Bluetooth port), and a Wi-Fi 5 GHz~6 GHz-band port. The locations and order of the diplexers and antennas in each of designs 500A and 500B may be exchanged. An isolation of 20 dB may be achieved at 5 GHz and 6 GHz.

Figure 6A:
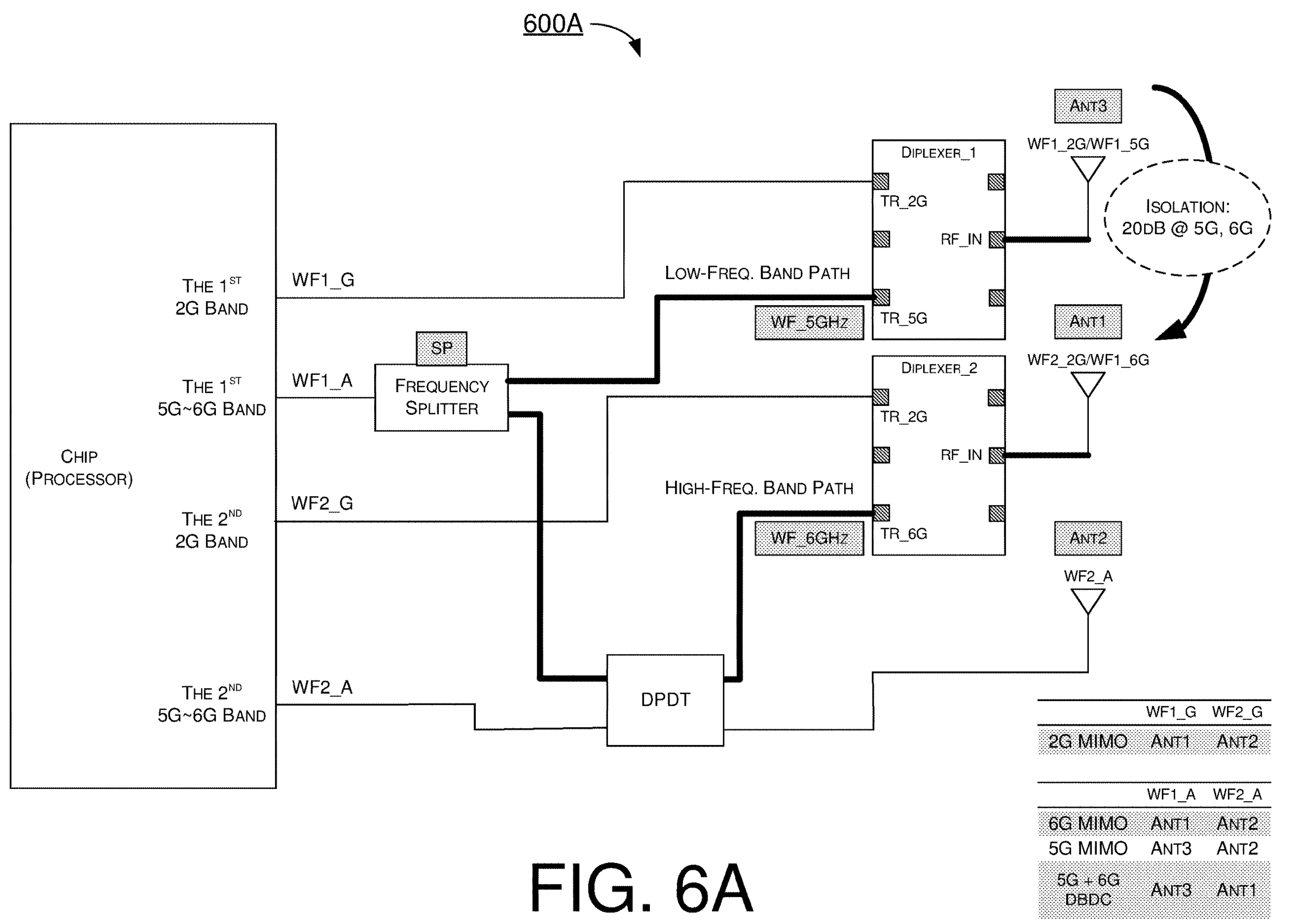
FIG. 6A and FIG. 6B each is a diagram of an example design under a proposed scheme in accordance with the present disclosure.
Figure 6B:
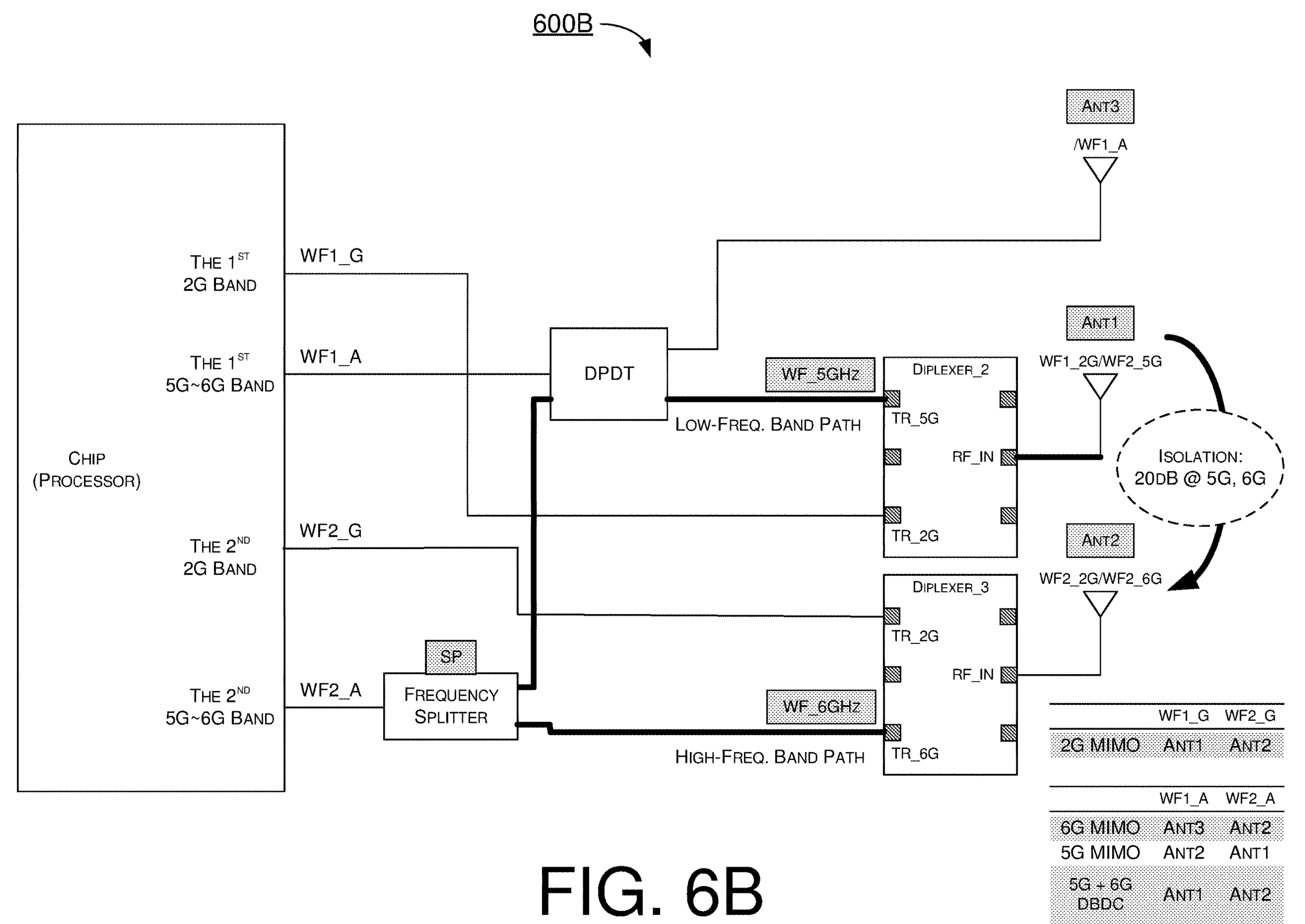

FIG. 6A and FIG. 6B each illustrates a respective aspect of an example design 600A or 600B of a front-end circuit under a fifth proposed scheme in accordance with the present disclosure. Referring to FIG. 6A and FIG. 6B, design 600 may include three antennas, five RF ports including one Bluetooth RF port, two Wi-Fi G-band (WF1_G, 2412~2484 MHz) RF ports, and two Wi-Fi 5 GHz~6 GHz band (WF1_A, 5180~7115 MHz) RF ports. Moreover, three diplexers, one DPDT switch, and one frequency splitter may be utilized in each of designs 600A and 600B. The location of WF_5 GHz (5180~5905 MHz) and WF_6 GHz (5955~7115 MHz) may be exchanged or otherwise swapped. The order of RF ports may be, from top to bottom as shown in each of FIG. 6A and FIG. 6B, a Wi-Fi G-band port (or, alternatively, a Bluetooth port), a Wi-Fi 5 GHz~6 GHz-band port, a Wi-Fi G-band port (or, alternatively, a Bluetooth port), and a Wi-Fi 5 GHz~6 GHz-band port. The locations and order of the diplexers and antennas in each of designs 600A and 600B may be exchanged. An isolation of 20 dB may be achieved at 5 GHz and 6 GHz.

Figure 7A:
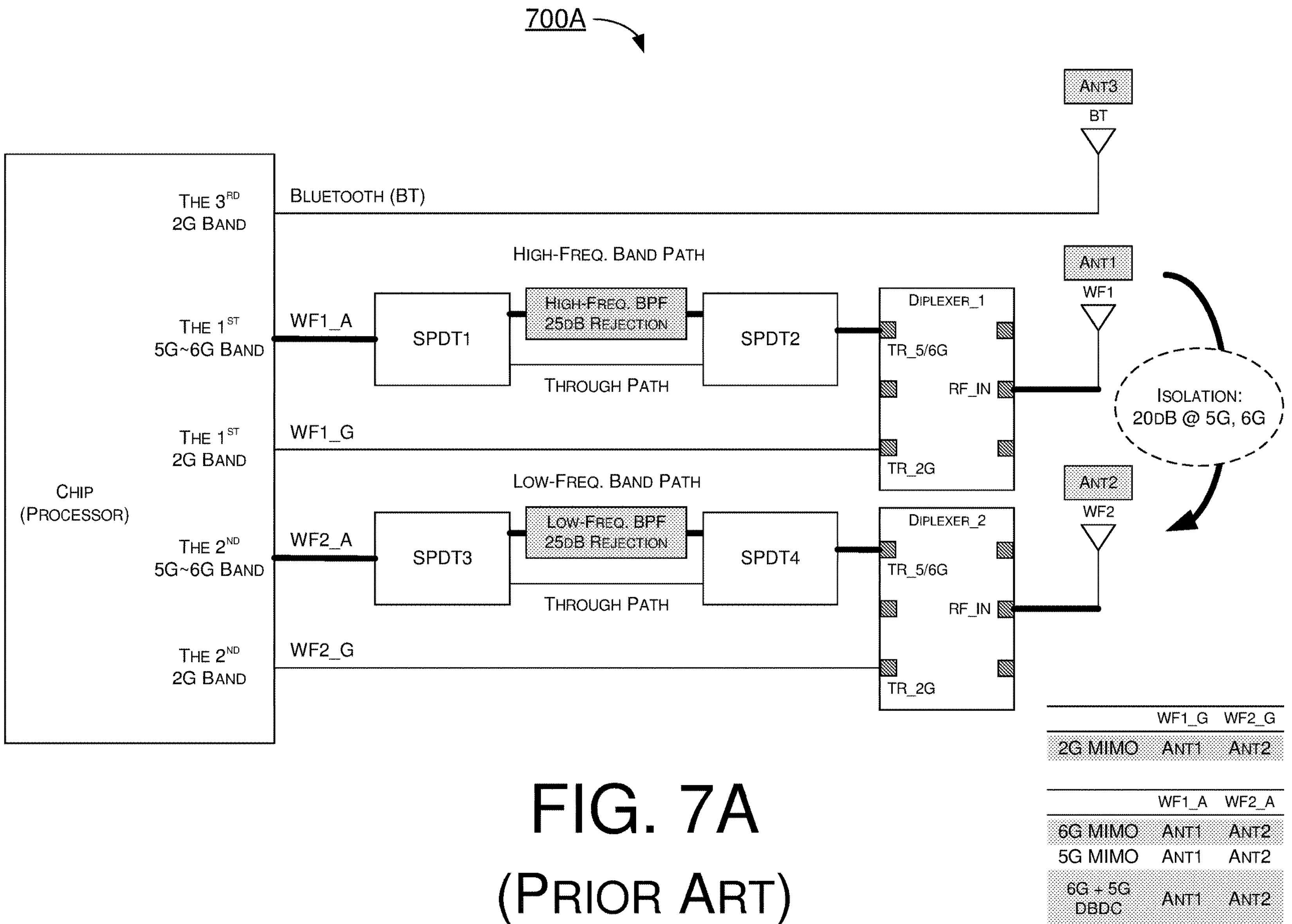
FIG. 7A and FIG. 7B each is a diagram of an existing design.
Figure 7B:
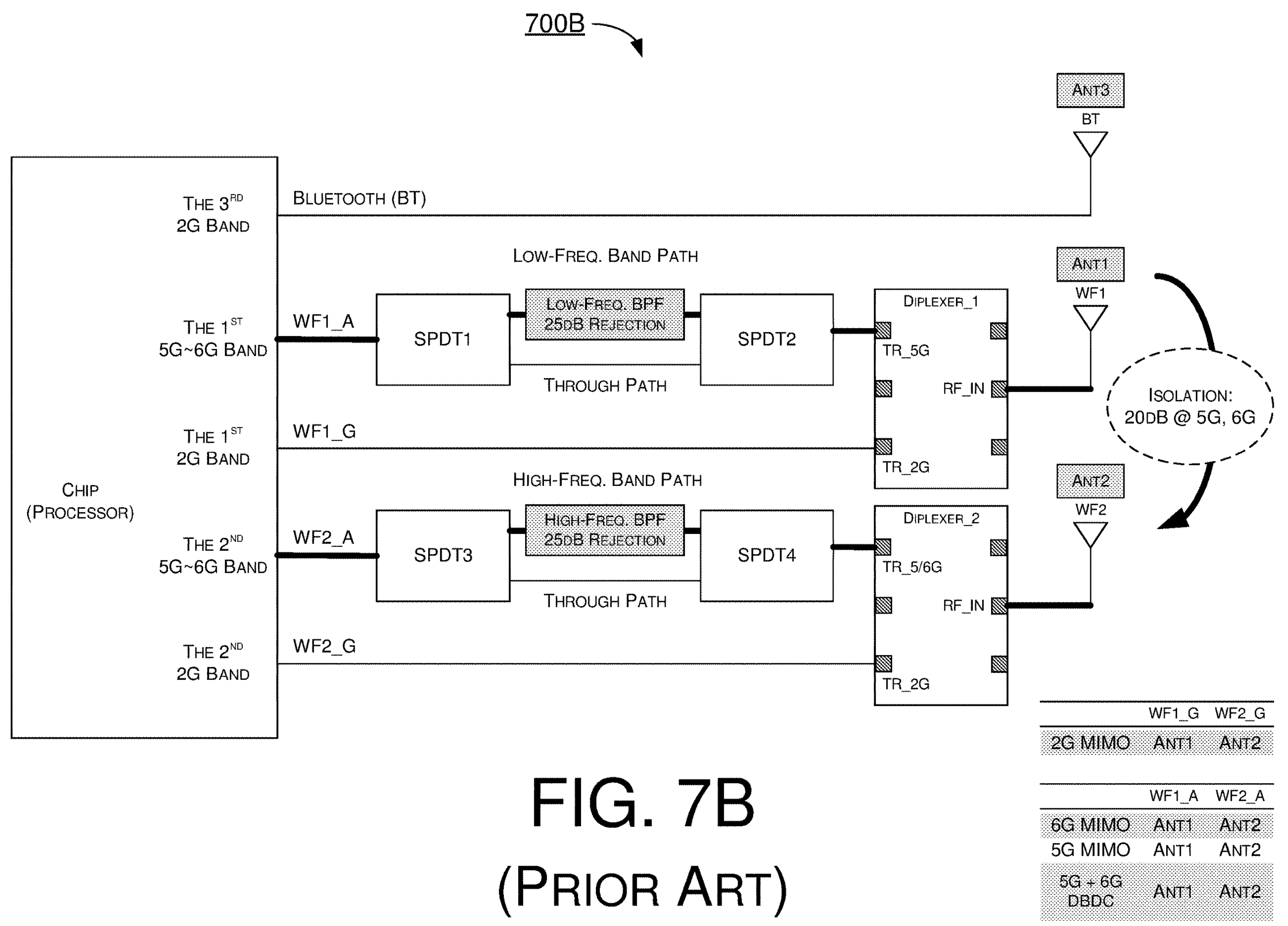

For reference and comparison with different new designs under various proposed schemes in accordance with the present disclosure, FIG. 7A and FIG. 7B each illustrates an existing design 700A or 700B of a front-end circuit. Referring to FIG. 7A and FIG. 7B, each of designs 700A and 700B utilizes a total of eight components to achieve a 45 dB isolation. The first 5 GHz~6 GHz band (WF1_A, 5180~7115 MHz) port is selectable, and it may be a through path (WF1_A, 5180~7115 MHz) or a high-frequency band (5955~7115 MHz) path by using a first SPDT (SPDT1), a second SPDT (SPDT2) and a high-frequency band pass filter (BPF). The second 5 GHz~6 GHz band (WF2_A, 5180~7115 MHz) port is selectable too, and it may be a through path (WF2_A, 5180~7115 MHz) or a low-frequency band (5180~5905 MHz) path by using a third SPDT (SPDT3), a fourth SPDT (SPDT4) and a low-frequency BPF. There may be an isolation of 20 dB at 5 GHz and 6 GHz.

When operating in DBDC, each of designs 700A and 700B may use a first antenna (Ant1) and a second antenna (Ant2). The first 5 GHz~6 GHz band (WF1_A, 5180~7115 MHz) port is selected to the high-frequency band (5955~7115 MHz) path and assigned to Ant1. The second 5 GHz~6 GHz (WF2_A, 5180~7115 MHz) port is selected to the low-frequency band (5180~5905 MHz) path and assigned to Ant2. When operating in MIMO, each of designs 700A and 700B may also use Ant1 and Ant2. The first 5 GHz~6 GHz band (WF1_A, 5180~7115 MHz) port is selected to the through path (WF1_A, 5180~7115 MHz) and assigned to Ant1. The second 5 GHz~6 GHz band (WF2_A, 5180~7115 MHz) port is also selected to the through path (WF2_A, 5180~7115 MHz) and assigned to Ant2.

Illustrative Implementations

Figure 8:
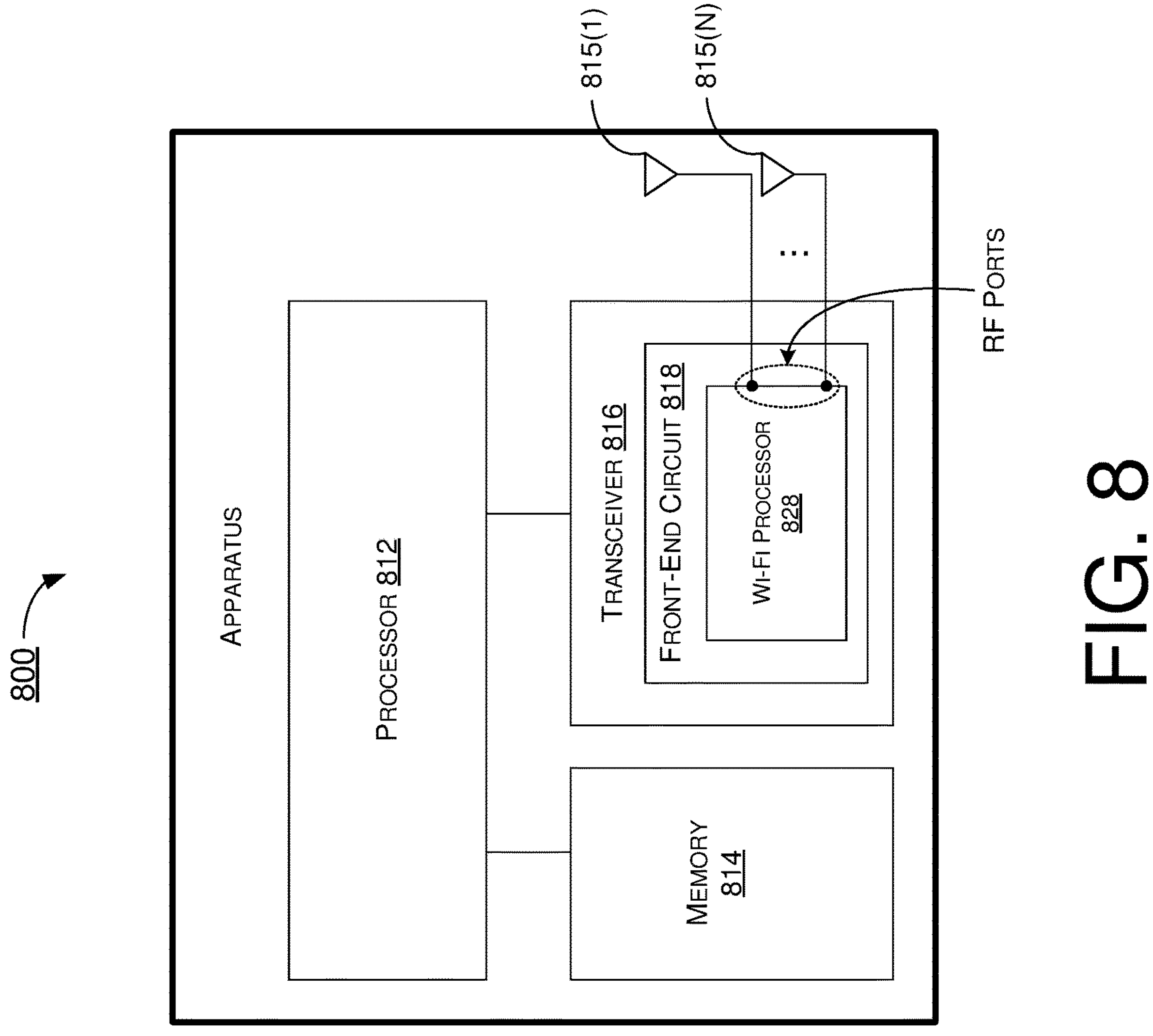
FIG. 8 is a schematic diagram of an example apparatus in accordance with an implementation of the present disclosure.

FIG. 8 illustrates an example apparatus 800 in accordance with an implementation of the present disclosure. Apparatus 800 may perform various functions to implement schemes, techniques, processes and methods described herein pertaining to Wi-Fi DBDC RF front-end circuit designs, including the various schemes described above with respect to various proposed designs, concepts, schemes, systems and methods described above as well as processes described below. For instance, apparatus 800 may be implemented in a user equipment (UE) or station (STA).

In the context of Wi-Fi, apparatus 800 may be a part of an electronic apparatus, which may be an access point (AP) STA or a non-AP STA, such as a portable or mobile apparatus, a wearable apparatus, a wireless communication apparatus or a computing apparatus. When implemented in a STA, apparatus 800 may be implemented in a smartphone, a smart watch, a personal digital assistant, a digital camera, or a computing equipment such as a tablet computer, a laptop computer or a notebook computer. Apparatus 800 may also be a part of a machine type apparatus, which may be an IoT apparatus such as an immobile or a stationary apparatus, a home apparatus, a wire communication apparatus or a computing apparatus. For instance, apparatus 800 may be implemented in a smart thermostat, a smart fridge, a smart door lock, a wireless speaker or a home control center. When implemented in or as a network apparatus, apparatus 800 may be implemented in a network node, such as an AP in a WLAN.

In some implementations, apparatus 800 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 800 may include at least some of those components shown in FIG. 8 such as a processor 812 for example. Apparatus 800 may further include one or more other components not pertinent to the proposed scheme of the present disclosure (e.g., internal power supply, display device and/or user interface device), and, thus, such component(s) of apparatus 800 are neither shown in FIG. 8 nor described below in the interest of simplicity and brevity.

In one aspect, processor 812 may be implemented in the form of one or more single-core processors, one or more multi-core processors, one or more RISC processors or one or more CISC processors. That is, even though a singular term “a processor” is used herein to refer to processor 812, processor 812 may include multiple processors in some implementations and a single processor in other implementations in accordance with the present disclosure. In another aspect, processor 812 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 812 is a special-purpose machine specifically designed, arranged and configured to perform specific tasks including those pertaining to Wi-Fi DBDC RF front-end circuit designs in accordance with various implementations of the present disclosure.

In some implementations, apparatus 800 may also include a transceiver 816 coupled to processor 812. Transceiver 816 may include a transmitter capable of wirelessly transmitting and a receiver capable of wirelessly receiving data. In some implementations, transceiver 816 may include a front-end circuit 818 in which various proposed designs in accordance with the present disclosure may be implemented, such as any of designs 100A, 100B, 200A, 200B, 300A, 300B, 400A, 400B, 500A, 500B, 600A and 600B described herein with reference to FIG. 1A~FIG. 6B. Transceiver 816 may also be equipped with a plurality of antennas 815(1)~815(N), with N being a positive integer greater than 1, such that transceiver 816 may communicate wirelessly (e.g., transmission and reception) via front-end circuit 818 and antennas 815(1)~815(N). It is noteworthy that, although transceiver 816 is illustrated as being external to and separate from processor 812, in some implementations, transceiver 816 may be an integral part of processor 812 as a system on chip (SoC).

In some implementations, apparatus 800 may further include a memory 814 coupled to processor 812 and capable of being accessed by processor 812 and storing data therein. In some implementations, memory 814 may include a type of random-access memory (RAM) such as dynamic RAM (DRAM), static RAM (SRAM), thyristor RAM (T-RAM) and/or zero-capacitor RAM (Z-RAM). Alternatively, or additionally, memory 814 may include a type of read-only memory (ROM) such as mask ROM, programmable ROM (PROM), erasable programmable ROM (EPROM) and/or electrically erasable programmable ROM (EEPROM). Alternatively, or additionally, memory 814 may include a type of non-volatile random-access memory (NVRAM) such as flash memory, solid-state memory, ferroelectric RAM (FeRAM), magnetoresistive RAM (MRAM) and/or phase-change memory.

Under various proposed schemes pertaining to Wi-Fi DBDC RF front-end circuit designs in accordance with the present disclosure, apparatus 800 may have a front-end circuit 818 configured to facilitate wireless communications in a DBDC application and a MIMO application, with front-end circuit 818 configured to support transmission at a first frequency band (e.g., a low-frequency band) and at a second frequency band (e.g., a high-frequency band). Front-end circuit 818 may include at least the following components: at least two antennas, at least two diplexers, a first circuit path and a second circuit path. The first circuit path may be coupled to one of the at least two antennas and may be configured to transmit and receive at the first frequency band. The second circuit path may be coupled to the other one of the at least two antennas and may be configured to transmit and receive at the second frequency band. The first frequency band and the second frequency band may be split from a Wi-Fi 5 GHz~6 GHz band. In some implementations, front-end circuit 818 may be configured with at least two antennas 815(1)~815(N) and two diplexers that provide an isolation between the low-frequency band and the high-frequency band. Moreover, front-end circuit 818 may also be configured with at least four RF ports. In some implementations, front-end circuit 818 may include a frequency splitter configured to divide the Wi-Fi 5 GHz~6 GHz band (e.g., in a range of 5180~7115 MHz or a different range) into the first frequency band in a range of 5180~5905 MHz and the second frequency band in a range of 5955~7115 MHz. In some implementations, the frequency splitter may include a diplexer or a switch.

In some implementations, front-end circuit 818 may further include at least a first diplexer and a Wi-Fi processor 828 having a plurality of RF ports with one of the plurality of RF ports configured with a Wi-Fi 5 GHz operating band and connecting to the frequency splitter. Moreover, the frequency splitter may be coupled to the first diplexer via the first circuit path. In some implementations, one of the plurality of RF ports may be configured with a Wi-Fi 2 GHz operating band and connecting to the first diplexer. Additionally, another one of the plurality of RF ports may be configured with a Bluetooth operating band and connecting the second diplexer. Alternatively, or additionally, another one of the plurality of RF ports may be configured with a Wi-Fi 2 GHz operating band and connecting the second diplexer.

In some implementations, front-end circuit 818 may be configured with at least two (e.g., two or three) antennas, three diplexers including the first diplexer, and Wi-Fi processor 828 having five RF ports (e.g., as in designs 100A, 100B, 200A and 200B), including: one Bluetooth RF port, first and second Wi-Fi G-band RF ports at 2412~2484 MHz, and first and second Wi-Fi 5 GHz~6 GHz band RF ports at 5180~7115 MHz. In some implementations, physical locations and an order of the physical locations of the three diplexers and the at least two antennas may be exchangeable. Additionally, an order of physical locations of the five RF ports from one side of the front-end circuit to an opposite side of the front-end circuit may be as follows: the one Bluetooth RF port, the first Wi-Fi 5 GHz~6 GHz band RF port, the first Wi-Fi G-band RF port, the second Wi-Fi 5 GHz~6 GHz band RF port, and the second Wi-Fi G-band RF port. Moreover, a location of the first Wi-Fi 5 GHz~6 GHz band RF port may be exchangeable with a location of the second Wi-Fi 5 GHz~6 GHz band RF port. Furthermore, a location of the one Bluetooth RF port may be exchangeable with a location of either of the first or the second Wi-Fi G-band RF port.

In some implementations, such as in designs 100A and 200A, front-end circuit 818 may include a first antenna (Ant1), a second antenna (Ant2) and a third antenna (Ant3). The frequency splitter may be coupled to a second diplexer of the three diplexers via the second circuit path. Furthermore, in the DBDC application, for a first type of DBDC (type 1), the first antenna may be used for the first frequency band and the second antenna may be used for the second frequency band. Additionally, in the DBDC application, for a second type of DBDC (type 2), the second antenna may be used for the first frequency band and the third antenna may be used for the second frequency band. Moreover, in the MIMO application, the first antenna and the second antenna may be used for Wi-Fi 2.4 GHz MIMO, the second antenna and the third antenna may be used for a high-frequency band MIMO at 5955~7115 MHz, and the first antenna and the second antenna may be used for a low-frequency band MIMO at 5180~5905 MHz.

In some implementations, such as in design 100B, front-end circuit 818 may include a first antenna (Ant1), a second antenna (Ant2) and a third antenna (Ant3). Furthermore, in the DBDC application, for a first type of DBDC, the first antenna may be used for the first frequency band and the third antenna may be used for the second frequency band. Moreover, in the MIMO application, the first antenna and the second antenna may be used for Wi-Fi 2.4 GHz MIMO, the second antenna and the third antenna may be used for a high-frequency band MIMO at 5955~7115 MHz, and the first antenna and the second antenna may be used for a low-frequency band MIMO at 5180~5905 MHz.

In some implementations, such as in design 200B, front-end circuit 818 may include a first antenna (Ant1), a second antenna (Ant2) and a third antenna (Ant3). Furthermore, in the DBDC application, the third antenna may be used for the second frequency band and the second antenna may be used for the first frequency band. Moreover, in the MIMO application, the first antenna and the second antenna may be used for Wi-Fi 2.4 GHz MIMO, the first antenna and the third antenna may be used for a high-frequency band MIMO at 5955~7115 MHz, and the first antenna and the second antenna may be used for a low-frequency band MIMO at 5180~5905 MHz.

In some implementations, front-end circuit 818 may be configured with at least two (e.g., two or three) antennas, two diplexers including the first diplexer, one filter (e.g., low-pass filter or high-pass filter) and five RF ports (e.g., as in designs 300A and 300B), including: first and second Wi-Fi G-band RF ports at 2412~2484 MHz, and first and second Wi-Fi 5 GHz~6 GHz band RF ports at 5180~7115 MHz. In some implementations, physical locations and an order of the physical locations of the two diplexers and the three antennas may be exchangeable. Additionally, an order of physical locations of the four RF ports from one side of the front-end circuit to an opposite side of the front-end circuit may be as follows: the first Wi-Fi G-band RF port, the first Wi-Fi 5 GHz~6 GHz band RF port, the second Wi-Fi G-band RF port, and the second Wi-Fi 5 GHz 6~GHz band RF port. Moreover, a location of the first Wi-Fi 5 GHz~6 GHz band RF port may be exchangeable with a location of the second Wi-Fi 5 GHz~6 GHz band RF port.

In some implementations, such as in design 300A, front-end circuit 818 may include a first antenna (Ant1), a second antenna (Ant2) and a third antenna (Ant3). Furthermore, in the DBDC application, the second antenna, via the filter, may be used for the first frequency band and the first antenna may be used for the second frequency band. Moreover, in the MIMO application, the first antenna and the third antenna may be used for Wi-Fi 2.4 GHz MIMO, the first antenna and the third antenna may be used for a high-frequency band MIMO at 5955~7115 MHz, and the second antenna and the third antenna may be used for a low-frequency band MIMO at 5180~5905 MHz.

In some implementations, such as in design 300B, front-end circuit 818 may include a first antenna (Ant1), a second antenna (Ant2) and a third antenna (Ant3). Furthermore, in the DBDC application, the first antenna may be used for the first frequency band and the third antenna, via the filter, may be used for the second frequency band. Moreover, in the MIMO application, the first antenna and the second antenna may be used for Wi-Fi 2.4 GHz MIMO, the second antenna and the third antenna may be used for a high-frequency band MIMO at 5955~7115 MHz, and the first antenna and the second antenna may be used for a low-frequency band MIMO at 5180~5905 MHz.

In some implementations, front-end circuit 818 may be configured with at least two (e.g., two or three) antennas, three diplexers including the first diplexer, one DPDT switch and five RF ports (e.g., as in designs 400A, 400B, 500A and 500B), including: one Bluetooth RF port, first and second Wi-Fi G-band RF ports at 2412~2484 MHz, and first and second Wi-Fi 5 GHz~6 GHz band RF ports at 5180~7115 MHz. In some implementations, physical locations and an order of the physical locations of the three diplexers and the at least two antennas may be exchangeable. Additionally, an order of physical locations of the five RF ports from one side of the front-end circuit to an opposite side of the front-end circuit may be as follows: the one Bluetooth RF port, the first Wi-Fi 5 GHz~6 GHz band RF port, the first Wi-Fi G-band RF port, the second Wi-Fi 5 GHz~6 GHz band RF port, and the second Wi-Fi G-band RF port. Moreover, a location of the first Wi-Fi 5 GHz~6 GHz band RF port may be exchangeable with a location of the second Wi-Fi 5 GHz~6 GHz band RF port. Furthermore, a location of the one Bluetooth RF port may be exchangeable with a location of either of the first or the second Wi-Fi G-band RF port.

In some implementations, such as in design 400A, front-end circuit 818 may include a first antenna (Ant1), a second antenna (Ant2) and a third antenna (Ant3). Furthermore, in the DBDC application, the second antenna may be used for the first frequency band and the first antenna, via the DPDT switch, may be used for the second frequency band. Moreover, in the MIMO application, the first antenna and the second antenna may be used for Wi-Fi 2.4 GHz MIMO, the first antenna and the third antenna may be used for a high-frequency band MIMO at 5955~7115 MHz, and the second antenna and the third antenna may be used for a low-frequency band MIMO at 5180~5905 MHz.

In some implementations, such as in design 400B, front-end circuit 818 may include a first antenna (Ant1), a second antenna (Ant2) and a third antenna (Ant3). Furthermore, in the DBDC application, the first antenna, via the DPDT switch, may be used for the first frequency band and the third antenna may be used for the second frequency band. Moreover, in the MIMO application, the first antenna and the second antenna may be used for Wi-Fi 2.4 GHz MIMO, the second antenna and the third antenna may be used for a high-frequency band MIMO at 5955~7115 MHz, and the first antenna and the second antenna may be used for a low-frequency band MIMO at 5180~5905 MHz.

In some implementations, such as in design 500A, front-end circuit 818 may include a first antenna (Ant1), a second antenna (Ant2) and a third antenna (Ant3). Furthermore, in the DBDC application, the third antenna may be used for the first frequency band and the first antenna, via the DPDT switch, may be used for the second frequency band. Moreover, in the MIMO application, the first antenna and the second antenna may be used for Wi-Fi 2.4 GHz MIMO, the first antenna and the second antenna may be used for a high-frequency band MIMO at 5955~7115 MHz, and the second antenna and the third antenna may be used for a low-frequency band MIMO at 5180~5905 MHz.

In some implementations, such as in design 500B, front-end circuit 818 may include a first antenna (Ant1), a second antenna (Ant2) and a third antenna (Ant3). Furthermore, in the DBDC application, the first antenna, via the DPDT switch, may be used for the first frequency band and the second antenna may be used for the second frequency band. Moreover, in the MIMO application, the first antenna and the second antenna may be used for Wi-Fi 2.4 GHz MIMO, the second antenna and the third antenna may be used for a high-frequency band MIMO at 5955~7115 MHz, and the first antenna and the third antenna may be used for a low-frequency band MIMO at 5180~5905 MHz.

In some implementations, front-end circuit 818 may be configured with at least two (e.g., two or three) antennas, two diplexers including the first diplexer, one DPDT switch and four RF ports (e.g., as in designs 600A and 600B), including: first and second Wi-Fi G-band RF ports at 2412~2484 MHz, and first and second Wi-Fi 5 GHz~6 GHz band RF ports at 5180~7115 MHz. In some implementations, physical locations and an order of the physical locations of the two diplexers and the three antennas may be exchangeable. Additionally, an order of physical locations of the four RF ports from one side of the front-end circuit to an opposite side of the front-end circuit may be as follows: the first Wi-Fi G-band RF port, the first Wi-Fi 5 GHz~6 GHz band RF port, the second Wi-Fi G-band RF port, and the second Wi-Fi 5 GHz~6 GHz band RF port. Moreover, a location of the first Wi-Fi 5 GHz~6 GHz band RF port may be exchangeable with a location of the second Wi-Fi 5 GHz~6 GHz band RF port.

In some implementations, such as in design 600A, front-end circuit 818 may include a first antenna (Ant1), a second antenna (Ant2) and a third antenna (Ant3). Furthermore, in the DBDC application, the third antenna may be used for the first frequency band and the first antenna, via the DPDT switch, may be used for the second frequency band. Moreover, in the MIMO application, the first antenna and the third antenna may be used for Wi-Fi 2.4 GHz MIMO, the first antenna and the second antenna may be used for a high-frequency band MIMO at 5955~7115 MHz, and the second antenna and the third antenna may be used for a low-frequency band MIMO at 5180~5905 MHz.

In some implementations, such as in design 600B, front-end circuit 818 may include a first antenna (Ant1), a second antenna (Ant2) and a third antenna (Ant3). Furthermore, in the DBDC application, the first antenna, via the DPDT switch, may be used for the first frequency band and the second antenna may be used for the second frequency band. Moreover, in the MIMO application, the first antenna and the second antenna may be used for Wi-Fi 2.4 GHz MIMO, the second antenna and the third antenna may be used for a high-frequency band MIMO at 5955~7115 MHz, and the first antenna and the third antenna may be used for a low-frequency band MIMO at 5180~5905 MHz.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A device, configured to facilitate wireless communications in a dual-band dual-concurrent (DBDC) application and a multiple-input-multiple-output (MIMO) application, comprising:

a front-end circuit, configured to support transmission at a first frequency band and at a second frequency band, comprising:

a frequency splitter;

at least two diplexers;

a filter;

at least three antennas, wherein the frequency splitter is configured to divide the Wi-Fi 5GHz ~ 6GHz band in a range of 5180~7115 MHz into the first frequency band in a range of 5180~5905 MHz and the second frequency band in a range of 5955~7115 MHz, wherein the frequency splitter is further configured to output the first frequency band to one of the at least three antennas via a first circuit path and to output the second frequency band to another one of the at least three antennas via a second circuit path, wherein the front-end circuit further comprises a Wi-Fi processor having a plurality of radio frequency (RF) ports with one of the plurality of RF ports configured with a Wi-Fi 5 GHz operating band and connecting to the frequency splitter, wherein the frequency splitter is coupled to a first diplexer of the at least two diplexers via the first circuit path with the first diplexer connected to one of the at least three antennas, wherein the frequency splitter is further coupled to:

a second diplexer of the at least two diplexers via the second circuit path with the second diplexer connected to another one of the at least three antennas; or the filter via the second circuit path with the filter connected to the another one of the at least three antennas.

2. The device of claim 1, wherein the front-end circuit comprises three antennas, three diplexers including the first diplexer, and the Wi-Fi processor having five RF ports comprising:

one Bluetooth RF port;

first and second Wi-Fi G-band RF ports at 2412~2484 MHz; and first and second Wi-Fi 5 GHz~6 GHz band RF ports at 5180~7115 MHz.

3. The device of claim 2, wherein an order of physical locations of the five RF ports from one side of the front-end circuit to an opposite side of the front-end circuit comprises the one Bluetooth RF port, the first Wi-Fi 5 GHz~6 GHz band RF port, the first Wi-Fi G-band RF port, the second Wi-Fi 5 GHz~6 GHz band RF port, and the second Wi-Fi G-band RF port, wherein a location of the first Wi-Fi 5 GHz~6 GHz band RF port is exchangeable with a location of the second Wi-Fi 5 GHz~6 GHz band RF port, and wherein a location of the one Bluetooth RF port is exchangeable with a location of either of the first or the second Wi-Fi G-band RF port.

4. The device of claim 3, wherein the front-end circuit comprises a first antenna (Ant1), a second antenna (Ant2) and a third antenna (Ant3), and wherein:

in the DBDC application, for a first type of DBDC, the first antenna is used for the first frequency band and the second antenna is used for the second frequency band, and, for a second type of DBDC, the second antenna is used for the first frequency band and the third antenna is used for the second frequency band; and in the MIMO application, the first antenna and the second antenna are used for Wi-Fi 2.4 GHz MIMO, the second antenna and the third antenna are used for a high-frequency band MIMO at 5955~7115 MHz, and the first antenna and the second antenna are used for a low-frequency band MIMO at 5180~5905 MHz.

5. The device of claim 3, wherein the front-end circuit comprises a first antenna (Ant1), a second antenna (Ant2) and a third antenna (Ant3), and wherein:

in the DBDC application, for a first type of DBDC, the first antenna is used for the first frequency band and the third antenna is used for the second frequency band; and in the MIMO application, the first antenna and the second antenna are used for Wi-Fi 2.4 GHz MIMO, the second antenna and the third antenna are used for a high-frequency band MIMO at 5955~7115 MHz, and the first antenna and the second antenna are used for a low-frequency band MIMO at 5180~5905 MHz.

6. The device of claim 3, wherein the front-end circuit comprises a first antenna (Ant1), a second antenna (Ant2) and a third antenna (Ant3), and wherein:

in the DBDC application, the third antenna is used for the second frequency band and the second antenna is used for the first frequency band; and in the MIMO application, the first antenna and the second antenna are used for Wi-Fi 2.4 GHz MIMO, the first antenna and the third antenna are used for a high-frequency band MIMO at 5955~7115 MHz, and the first antenna and the second antenna are used for a low-frequency band MIMO at 5180~5905 MHz.

7. The device of claim 1, wherein the front-end circuit is configured with four RF ports comprising:

first and second Wi-Fi G-band RF ports at 2412~2484 MHz; and first and second Wi-Fi 5 GHz~6 GHz band RF ports at 5180~7115 MHz, wherein the frequency splitter is coupled to the filter via the second circuit path.

8. The device of claim 7, wherein an order of physical locations of the four RF ports from one side of the front-end circuit to an opposite side of the front-end circuit comprises the first Wi-Fi G-band RF port, the first Wi-Fi 5 GHz~6 GHz band RF port, the second Wi-Fi G-band RF port, and the second Wi-Fi 5 GHz~6 GHz band RF port, and wherein a location of the first Wi-Fi 5 GHz~6 GHz band RF port is exchangeable with a location of the second Wi-Fi 5 GHz~6 GHz band RF port.

9. The device of claim 8, wherein the front-end circuit comprises a first antenna (Ant1), a second antenna (Ant2) and a third antenna (Ant3), and wherein:

in the DBDC application, the second antenna, via the filter, is used for the first frequency band and the first antenna is used for the second frequency band; and in the MIMO application, the first antenna and the third antenna are used for Wi-Fi 2.4 GHz MIMO, the first antenna and the third antenna are used for a high-frequency band MIMO at 5955~7115 MHz, and the second antenna and the third antenna are used for a low-frequency band MIMO at 5180~5905 MHz.

10. The device of claim 8, wherein the front-end circuit comprises a first antenna (Ant1), a second antenna (Ant2) and a third antenna (Ant3), and wherein:

in the DBDC application, the first antenna is used for the first frequency band and the third antenna, via the filter, is used for the second frequency band; and in the MIMO application, the first antenna and the second antenna are used for Wi-Fi 2.4 GHz MIMO, the second antenna and the third antenna are used for a high-frequency band MIMO at 5955~7115 MHz, and the first antenna and the second antenna are used for a low-frequency band MIMO at 5180~5905 MHz.

11. The device of claim 1, wherein the front-end circuit is configured with five RF ports comprising:

one Bluetooth RF port;

first and second Wi-Fi G-band RF ports at 2412~2484 MHz; and first and second Wi-Fi 5 GHz~6 GHz band RF ports at 5180~7115 MHz, wherein the frequency splitter is coupled to the DPDT switch via the second circuit path.

12. The device of claim 11, wherein an order of physical locations of the five RF ports from one side of the front-end circuit to an opposite side of the front-end circuit comprises the one Bluetooth RF port, the first Wi-Fi 5 GHz~6 GHz band RF port, the first Wi-Fi G-band RF port, the second Wi-Fi 5 GHz~6 GHz band RF port, and the second Wi-Fi G-band RF port, wherein a location of the first Wi-Fi 5 GHz~6 GHz band RF port is exchangeable with a location of the second Wi-Fi 5 GHz~6 GHz band RF port, and wherein a location of the one Bluetooth RF port is exchangeable with a location of either of the first or the second Wi-Fi G-band RF port.

13. The device of claim 12, wherein the front-end circuit comprises a first antenna (Ant1), a second antenna (Ant2) and a third antenna (Ant3), and wherein:

in the DBDC application, the second antenna is used for the first frequency band and the first antenna, via the DPDT switch, is used for the second frequency band; and in the MIMO application, the first antenna and the second antenna are used for Wi-Fi 2.4 GHz MIMO, the first antenna and the third antenna are used for a high-frequency band MIMO at 5955~7115 MHz, and the second antenna and the third antenna are used for a low-frequency band MIMO at 5180~5905 MHz.

14. The device of claim 12, wherein the front-end circuit comprises a first antenna (Ant1), a second antenna (Ant2) and a third antenna (Ant3), and wherein:

in the DBDC application, the first antenna, via the DPDT switch, is used for the first frequency band and the third antenna is used for the second frequency band; and in the MIMO application, the first antenna and the second antenna are used for Wi-Fi 2.4 GHz MIMO, the second antenna and the third antenna are used for a high-frequency band MIMO at 5955~7115 MHz, and the first antenna and the second antenna are used for a low-frequency band MIMO at 5180~5905 MHz.

15. The device of claim 12, wherein the front-end circuit comprises a first antenna (Ant1), a second antenna (Ant2) and a third antenna (Ant3), and wherein:

in the DBDC application, the third antenna is used for the first frequency band and the first antenna, via the DPDT switch, is used for the second frequency band; and in the MIMO application, the first antenna and the second antenna are used for Wi-Fi 2.4 GHz MIMO, the first antenna and the second antenna are used for a high-frequency band MIMO at 5955~7115 MHz, and the second antenna and the third antenna are used for a low-frequency band MIMO at 5180~5905 MHz.

16. The device of claim 12, wherein the front-end circuit comprises a first antenna (Ant1), a second antenna (Ant2) and a third antenna (Ant3), and wherein:

in the DBDC application, the first antenna, via the DPDT switch, is used for the first frequency band and the second antenna is used for the second frequency band; and in the MIMO application, the first antenna and the second antenna are used for Wi-Fi 2.4 GHz MIMO, the second antenna and the third antenna are used for a high-frequency band MIMO at 5955~7115 MHz, and the first antenna and the third antenna are used for a low-frequency band MIMO at 5180~5905 MHz.

17. The device of claim 1, wherein the front-end circuit is configured with four RF ports comprising:

first and second Wi-Fi G-band RF ports at 2412~2484 MHz; and first and second Wi-Fi 5 GHz~6 GHz band RF ports at 5180~7115 MHz, wherein the frequency splitter is coupled to the DPDT switch via the second circuit path.

18. The device of claim 17, wherein an order of physical locations of the four RF ports from one side of the front-end circuit to an opposite side of the front-end circuit comprises the first Wi-Fi G-band RF port, the first Wi-Fi 5 GHz~6 GHz band RF port, the second Wi-Fi G-band RF port, and the second Wi-Fi 5 GHz~6 GHz band RF port, and wherein a location of the first Wi-Fi 5 GHz~6 GHz band RF port is exchangeable with a location of the second Wi-Fi 5 GHz~6 GHz band RF port.

19. A device, configured to facilitate wireless communications in a dual- band dual-concurrent (DBDC) application and a multiple-input-multiple-output (MIMO) application, comprising:

a front-end circuit, configured to support transmission at a first frequency band and at a second frequency band, comprising:

a frequency splitter;

at least two diplexers;

a double-pole-double-throw (DPDT) switch; and at least three antennas, wherein the frequency splitter is configured to divide the Wi-Fi 5GHz~6GHz band in a range of 5180~7115 MHz into the first frequency band in a range of 5180~5905 MHz and the second frequency band in a range of 5955~7115 MHz, wherein the frequency splitter is further configured to output the first frequency band to one of the at least three antennas via a first circuit path and to output the second frequency band to another one of the at least three antennas via a second circuit path, wherein the front-end circuit further comprises a Wi-Fi processor having a plurality of radio frequency (RF) ports with one of the plurality of RF ports configured with a Wi-Fi 5GHz operating band and connecting to the frequency splitter, wherein the frequency splitter is coupled to a first diplexer of the at least two diplexers via the first circuit path with the first diplexer connected to one of the at least three antennas, wherein the frequency splitter is further coupled to:

a second diplexer of the at least two diplexers via the second circuit path with the second diplexer connected to another one of the at least three antennas; or the DPDT switch with the DPDT switch connected to the second diplexer which is connected to the another one of the at least three antennas.

* * * * *